(12) United States Patent
Nagashima et al.

(10) Patent No.: US 7,473,437 B2
(45) Date of Patent: Jan. 6, 2009

(54) METHOD OF FORMING FLUORESCENT IMAGE, FLUORESCENT IMAGE, AND INK-JET RECORDING METHOD

(75) Inventors: Akira Nagashima, Tokyo (JP); Masako Udagawa, Kawasaki (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/411,073

(22) Filed: Apr. 26, 2006

(65) Prior Publication Data

US 2006/0234018 A1 Oct. 19, 2006

Related U.S. Application Data

(63) Continuation of application No. PCT/JP2005/020484, filed on Nov. 2, 2005.

(30) Foreign Application Priority Data

Nov. 2, 2004 (JP) ............................. 2004-319314

(51) Int. Cl.
- B41M 5/00 (2006.01)
- B05D 1/36 (2006.01)
- B41J 2/015 (2006.01)

(52) U.S. Cl. ...................... 427/261; 347/105; 428/32.1; 428/195.1; 428/690

(58) Field of Classification Search .................... None
See application file for complete search history.

(56) References Cited

U.S. PATENT DOCUMENTS

| 4,313,124 | A | 1/1982 | Hara ...................... 346/140 R |
| 4,345,262 | A | 8/1982 | Shirato et al. ........... 346/140 R |
| 4,459,600 | A | 7/1984 | Sato et al. ............... 346/140 R |
| 4,463,359 | A | 7/1984 | Ayata et al. ................ 346/1.1 |
| 4,558,333 | A | 12/1985 | Sugitani et al. ......... 346/140 R |
| 4,608,577 | A | 8/1986 | Hori ............................ 346/140 |
| 4,723,129 | A | 2/1988 | Endo et al. .................... 346/1.1 |
| 4,740,796 | A | 4/1988 | Endo et al. .................... 346/1.1 |
| 5,078,790 | A | 1/1992 | Tochihara et al. ............. 106/20 |
| 5,080,716 | A | 1/1992 | Aoki et al. ..................... 106/20 |
| 5,132,700 | A | 7/1992 | Tochihara et al. ............. 346/1.1 |
| 5,213,613 | A | 5/1993 | Nagashima et al. ........ 106/20 R |
| 5,218,376 | A | 6/1993 | Asai ........................... 346/1.1 |
| 5,258,066 | A | 11/1993 | Kobayashi et al. ......... 106/22 R |
| 5,296,022 | A | 3/1994 | Kobayashi et al. ......... 106/20 D |
| 5,409,529 | A | 4/1995 | Nagashima et al. ........ 106/22 H |
| 5,451,251 | A | 9/1995 | Mafune et al. ............. 106/22 H |
| 5,478,383 | A | 12/1995 | Nagashima et al. ........ 106/22 H |
| 5,482,545 | A | 1/1996 | Aoki et al. ................. 106/22 K |
| 5,571,313 | A | 11/1996 | Mafune et al. ............. 106/22 H |

(Continued)

FOREIGN PATENT DOCUMENTS

JP          S54-56847          5/1979

(Continued)

Primary Examiner—Bruce H Hess
(74) Attorney, Agent, or Firm—Fitzpatrick, Cella, Harper & Scinto

(57) ABSTRACT

A fluorescent recorded image and an image forming method capable of achieving the compatibility between fluorescence intensity and recorded matter density are provided. The image is composed of multiple layers formed from fluorescent ink, or preferably fluorescent ink containing a surfactant. The method includes superimposing the fluorescent ink to form the fluorescent image.

14 Claims, 11 Drawing Sheets

U.S. PATENT DOCUMENTS

| | | | |
|---|---|---|---|
| 5,733,363 A | 3/1998 | Nagashima et al. | 106/31.43 |
| 5,865,883 A | 2/1999 | Teraoka et al. | 106/31.32 |
| 5,936,649 A | 8/1999 | Ikeda et al. | 347/87 |
| 6,155,673 A | 12/2000 | Nakajima et al. | 347/61 |
| 6,176,908 B1 | 1/2001 | Bauer et al. | 106/31.15 |
| 6,400,386 B1 * | 6/2002 | No | 347/176 |
| 6,488,364 B1 | 12/2002 | Nakajima et al. | 347/61 |
| 6,676,254 B2 | 1/2004 | Nagashima et al. | 347/100 |
| 6,676,734 B2 | 1/2004 | Nagashima et al. | 106/31.32 |
| 6,793,723 B2 | 9/2004 | Auslander et al. | 106/31.32 |
| 7,125,111 B2 | 10/2006 | Udagawa et al. | 347/100 |
| 7,141,105 B2 | 11/2006 | Udagawa et al. | 106/31.49 |
| 7,144,449 B2 | 12/2006 | Udagawa et al. | 106/31.15 |
| 7,195,340 B2 | 3/2007 | Nagashima et al. | 347/56 |
| 7,286,150 B2 * | 10/2007 | Hann | 347/172 |
| 2004/0074419 A1 | 4/2004 | Nagashima et al. | 106/31.32 |
| 2004/0183877 A1 | 9/2004 | Nagashima et al. | 347/100 |
| 2005/0088501 A1 | 4/2005 | Nagashima et al. | 347/100 |
| 2005/0204955 A1 | 9/2005 | Nagashima et al. | 106/31.59 |
| 2006/0012657 A1 | 1/2006 | Nagashima et al. | 347/100 |
| 2006/0152570 A1 | 7/2006 | Ishikawa et al. | 347/105 |
| 2006/0194056 A1 | 8/2006 | Nagashima et al. | 428/403 |
| 2006/0194897 A1 | 8/2006 | Kawabe et al. | 523/160 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |

FOREIGN PATENT DOCUMENTS

| | | |
|---|---|---|
| JP | S59-12367 | 1/1984 |
| JP | S59-138461 | 8/1984 |
| JP | S60-71260 | 4/1985 |
| JP | 60-45669 | 10/1985 |
| JP | 2783647 | 5/1988 |
| JP | 2-171280 | 7/1990 |
| JP | 7-276774 | 10/1995 |
| JP | 9-302293 | 11/1997 |
| JP | 10-46072 | 2/1998 |
| JP | 10-251570 | 9/1998 |
| JP | 10-287034 | 10/1998 |
| JP | 11-80632 | 3/1999 |
| JP | 2003-113331 | 4/2003 |
| JP | 2004-74626 | 3/2004 |
| JP | 2004-528458 | 9/2004 |
| WO | WO 02/092707 | 11/2002 |

* cited by examiner

METHOD OF FORMING FLUORESCENT IMAGE, FLUORESCENT IMAGE, AND INK-JET RECORDING METHOD This application is a continuation of International Application No. PCT/JP2005/020484, filed Nov. 2, 2005, which claims the benefit of Japanese Patent Application No. 2004-319314 filed Nov. 2, 2004.

BACKGROUND OF THE INVENTION

1. Field of the Invention

The present invention relates to a recording method. More specifically, the present invention relates to a method of forming a recorded image in which the fluorescence intensity and recording density of a fluorescent recorded matter obtained by means of fluorescent ink are good and which is excellent in reliability of image formation.

2. Description of Related Art

In recent years, ink which can be used in various applications has been desired. The applications of the ink are not only for the formation of beautiful color images. For example, a technology has been proposed and developed in which information such as characters, numbers, symbols or bar-codes, is recorded on a recording medium using an ink provided with fluorescence properties, the ink is irradiated with UV light of an appropriate wavelength and allowed to emit colored light, thereby providing the recording medium with additional information (such as security information) other than visual information. Among the technological developments, particularly in a system for reading out authentication (anti-counterfeit) information or security information by the use of an apparatus that causes the ink to emit fluorescence and scans the emission intensity thereof, a fluorescent coloring material is excited with light of a standard wavelength (e.g., 254 nm, standard excitation wavelength) used in the system so that fluorescence color development is brought about. The fluorescence color development is used for determination or measurement and applied to a mailing system or the like.

Considering ink in terms of the kinds of coloring materials, when a dye is used as a coloring material, the ink can be easily provided with a standard color tone. In some cases, however, the water resistance of the obtained image is inferior. In contrast, when a pigment is used as a coloring material, a standard color tone may not be obtained while resulting in good water resistance of the obtained image. In view of the above, an ink is proposed containing both a dye and a pigment as an ink capable of providing an image that satisfies both water resistance property and color tone. For example, JP-B-60-45669 (Patent Document 1) discloses a recording liquid that contains a water-soluble red dye (e.g., Acid Red 52) and a red pigment as recording agents, and a polymer dispersant for dispersing these recording agents into a liquid medium.

On the other hand, as a mailing system, fluorescent red is commonly printed in the U.S, and a dye such as Acid Red 52 (AR52), which is described in the above publication, is used as a fluorochrome. U.S. Pat. No. 6,176,908 (Patent Document 2) exemplifies the AR52 as a fluorescent dye and discloses an ink that contains the fluorescent dye, a pigment, and a polymer as a dispersant of the pigment. Furthermore, as described herein, in order to change the formed color tone of the "tint of an image" (i.e., for adjusting the color tone identified by the sense of a human being), the combination of dyes for matching to such a color tone has been known as a matter of design long before the description of Patent Document 2.

Furthermore, the invention disclosed in U.S. Pat. No. 6,176,908 (Patent Document 2) relates to an ink-jet ink in which a pigment is added to a fluorescent dye for improving the water resistance of the ink as in the case of JP-B-60-45669 (Patent Document 1), and there are described a system in which two kinds of fluorescent dyes are combined for the well-known object of visible (visual) tint, and a system in which an additive is added for improving fluorescence intensity (PMU level). As specific examples for improving the fluorescence intensity (PMU level), except for a pigment part (a polymer, tetraethylene glycol, or diethylene glycol), solvents such as water, 2-pyrrolidenone and tetraethylene glycol, and the following fluorescent coloring materials are described. In addition, as the multiple fluorescent coloring materials, examples of a combination of the above AR52 (0.4% by mass, 0.5% by mass to 3.0% by mass) with one of Acid Yellow 7 (AY7), Acid Yellow 73 (AY73) and Direct Yellow 96 (DY96), and the addition of Basic Yellow (BY40) to Basic Violet (RHDB) are described.

Moreover, Japanese Patent Application Laid-Open No. H11-80632 (Patent Document 3) discloses an invisible fluorescent aqueous ink containing three different fluorescent coloring materials (a fluorescent brightening agent, a yellow fluorescent dye based on a coumarin derivative, and a red fluorescent dye based on rhodamine-B or rhodamine-6G), and a postcard print using the ink. In the technical description thereof, each of those three different fluorescent coloring materials generates its peak emission due to UV light, and then other coloring materials are sequentially excited by the emission, finally causing fluorescent emission with a wavelength of 587 nm. In this publication, however, there is no specific description about such an excitation wavelength, and the technical description is performed on the basis of the result that the ink and its recorded image show the same fluorescence characteristics. Generally, water absorbs UV light, hence the fluorescence of a recorded image will be different from that of the ink used. Making a judgment from this fact, therefore, the invention described in the publication lacks credibility from engineering perspective. Furthermore, WO 02/092707 (Patent Document 4) discloses an ink that generates color emission as standard emission while forming a black image using multiple dyes (a red dye, a yellow dye, a blue dye, and a black dye) that emit fluorescence by virtue of excitation with UV light as with the effect of Patent Document 3. This publication describes, as a technical point which is different from that of Patent Document 3, an invention directed primarily to selecting multiple dyes in such a manner that an absorption spectrum in relatively longer wavelengths and an emission spectrum in shorter wavelengths are not overlapped. In this publication as well, the desired fluorescence intensity is not always ensured without fail because the relationship between the multiple fluorescent coloring materials cannot be analyzed sufficiently. On the other hand, Japanese Patent Application Laid-Open No. 2003-113331 (Patent Document 5) discloses the invention for improving the fluorescence characteristics of ink due to the relationship between solvents and fluorescent coloring materials. Patent Document 5 discloses a recording ink that includes two fluorescent coloring materials with the same color (there is also an example in which a coloring material having no fluorescence is added), two different organic solvents (e.g., glycerin and a nonionic surfactant) which have no compatibility to each other, and purified water for dissolving these components.

SUMMARY OF THE INVENTION

However, conventionally, a phenomenon called concentration quenching occurs with respect to the fluorescent color developability and concentration of ink on a recording material. That is, an increase in fluorescent coloring material in ink reduces fluorescence intensity. Therefore, no satisfactory recorded image achieving the compatibility between high fluorescence intensity and a high density has been proposed yet.

Therefore, an object of the present invention is to provide a reliable method of forming a recorded image which can provide a recorded matter having high fluorescence intensity and high recording density, and excellent in printing quality.

The above object is achieved by the present invention described below. That is, according to one aspect of the present invention, a method of forming an ink-jet recorded image is provided in which a fluorescent image is formed using fluorescent ink, the method of forming a fluorescent image being characterized by including superimposing fluorescent ink ejected from nozzles to form a fluorescent image.

According to another aspect of the present invention, an ink cartridge is provided including an ink storage portion storing fluorescent ink using at least a fluorescent coloring material as a coloring material, characterized in that the ink storage portion is formed of a compound selected from the group consisting of polyacetate and polyolefin, or has an ink holding member composed of a polymer formed of a compound selected from the group consisting of polyacetate and polyolefin.

According to the present invention, printing density can be increased without reducing fluorescence characteristics. Furthermore, both fluorescence intensity and printing density can be increased by reducing the content of a fluorescent coloring material in ink to be equal to or lower than the content at which concentration quenching is expressed.

DESCRIPTION OF THE PREFERRED EMBODIMENTS

Figure 1:
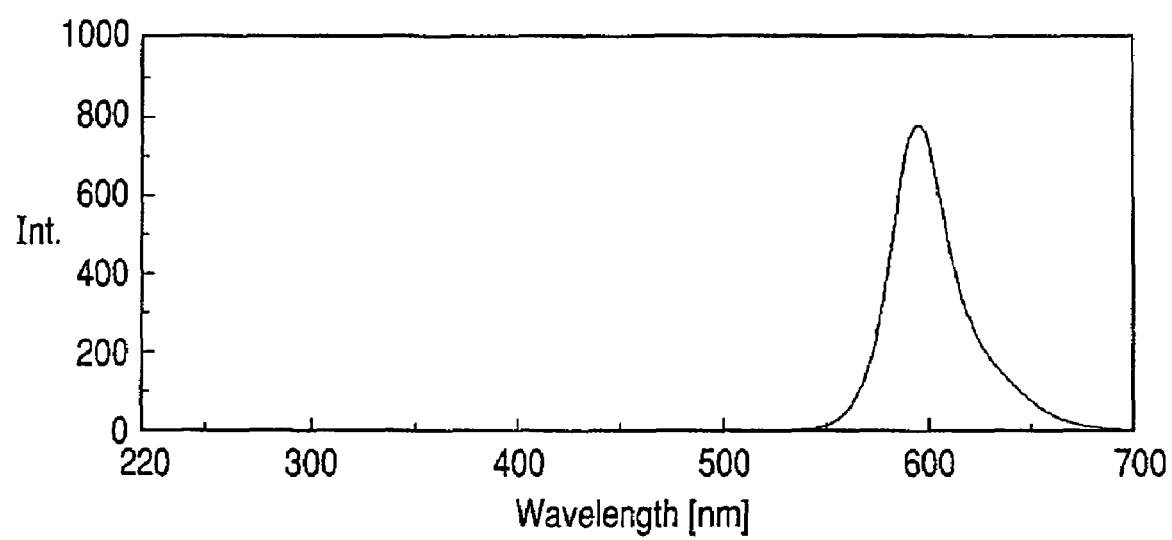
FIG. 1 is a diagram showing the fluorescent emission spectrum of C.I. Acid Red 52 at an excitation wavelength of 254 nm.

Hereinafter, the present invention will be described in more detail by way of a preferred embodiment. At first, description will be given concerning the mechanism by which a good recorded matter having sufficient fluorescence intensity and a high density can be obtained by means of the image forming method of the present invention. The inventors of the present invention have devised a wide variety of mechanisms for obtaining a recorded image having high fluorescence intensity, and have made studies on a wide variety of coloring materials and ink compositions. As a result, they have arrived at the new fact that a recorded image having high fluorescence intensity and high density can be obtained by means of a method of forming an ink-jet recorded image in which a fluorescent image is formed by means of fluorescent ink, which has not been conceived, the method of forming a fluorescent image being characterized by including superimposing fluorescent ink ejected from nozzles to form a fluorescent image, thereby achieving the present invention.

That is, the inventors have found that when fluorescent ink is superimposed on aqueous ink containing a fluorescent coloring material as a colorant by means of ink-jet recording to form a fluorescent image, a recorded matter having high density can be obtained without any reduction in fluorescence intensity even when a fluorescent coloring material is applied in such an amount that concentration quenching conventionally occurs to a recording material. In addition, they have found that when ink having the above constitution is placed and stored in an ink holding member and/or an ink storing member formed of a compound selected from the group consisting of polyacetate and polyolefin, an image can be obtained whose quality including fluorescence intensity and density is not adversely affected at all even after long-term storage, and furthermore, when the ink is used for ink-jet recording, no problem is raised in ink-jet recording properties.

When considering the mechanism by which the present invention can provide a stable, reliable and excellent image in which the compatibility between high fluorescence intensity and a high recording density has been achieved, it would be normal to concentrate attention on how to dissolve or disperse a coloring material in ink in a uniform and desirable state as a measure for improving the fluorescence intensity of the recorded article. In other words, investigation is made into how the aggregation of coloring material molecules or dispersed particles in ink is eliminated, how the sizes of coloring material molecules or dispersed particles can be reduced, or how the amount of a coloring material can be reduced, before ink is designed. That is, it should be attempted to design ink in this way so that coloring material molecules or dispersed particles in ink recorded on a recording material are prevented from aggregating to improve the fluorescence intensity of a coloring material.

On the other hand, in order to increase a recording density, investigation is made into how the amount of a coloring material applied to a recording material is increased, in other words, how the quantity of absorbed light is increased, designing ink. That is, density is increased by increasing the quantity of light absorbed by a coloring material, hence the coloring material is used in the highest amount at which no detrimental effects due to the aggregation of the coloring material occur on a recording material or in ink.

In view of the foregoing, the ink design for obtaining high fluorescence intensity is incompatible with the ink design for obtaining high recording density.

To cope with the foregoing, the inventors of the present invention have made studies again on the state of ink on a recording material in a recorded matter (printed matter) obtained by applying ink to the recording material, and a wide variety of recorded matters present in the world. As a result, at first, they have paid attention to the fact that the fluorescence intensity of a fluorescent recorded image increases as the number of times of superimposition of fluorescent ink increases when the fluorescent recorded matters is formed on a recording material by means of the fluorescent ink. Furthermore, they have found that the phenomenon is particularly good in ink-jet recording in which recording is performed out of contact with a recording material, and recorded matter density can be increased as in the case of fluorescence intensity by superimposing an ink having a fluorescent coloring material content at which no concentration quenching occurs in such a manner that the amount of the fluorescent coloring material applied to the recording material comes to be the same as the amount of the fluorescent coloring material achieved by applying at one time (or by one pass) an ink having a fluorescent coloring material content at which concentration quenching occurs. That is, they have found that the compatibility between the density and fluorescence intensity of a recorded matter, which could not have been conventionally achieved, can be achieved by superimposing ink having a coloring material content in the range in which no concentration quenching occurs on a recording material by means of ink-jet recording performed out of contact with the recording material, thereby arriving at the recording method of the present invention.

The inventors of the present invention consider that both the fluorescence intensity and density of a recorded matter can be significantly increased by the following specific mechanism.

Figure 14:
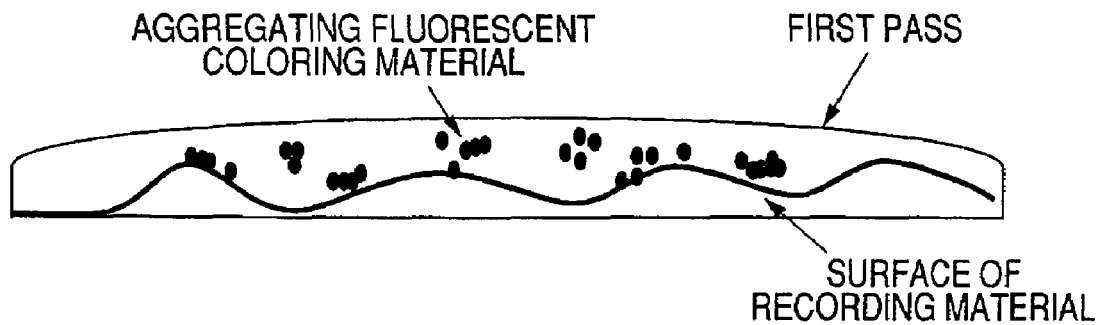
FIG. 14 is a drawing for explaining a conventional printing system in relation to the present invention.
Figure 15:
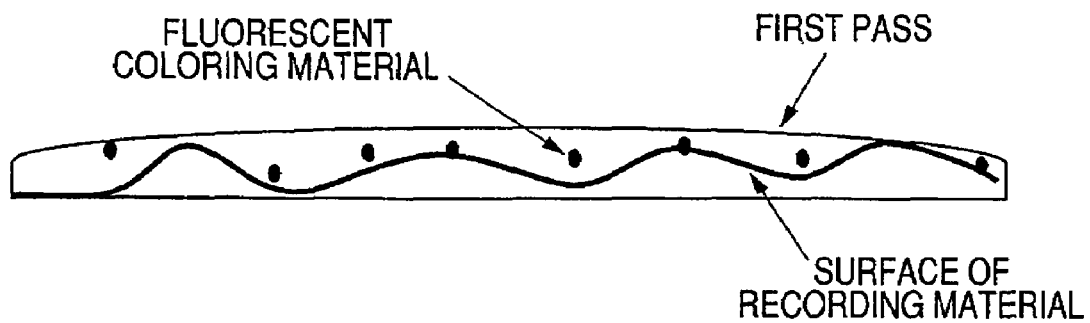
FIG. 15 is a drawing for explaining a conventional printing system in relation to the present invention.
Figure 16:
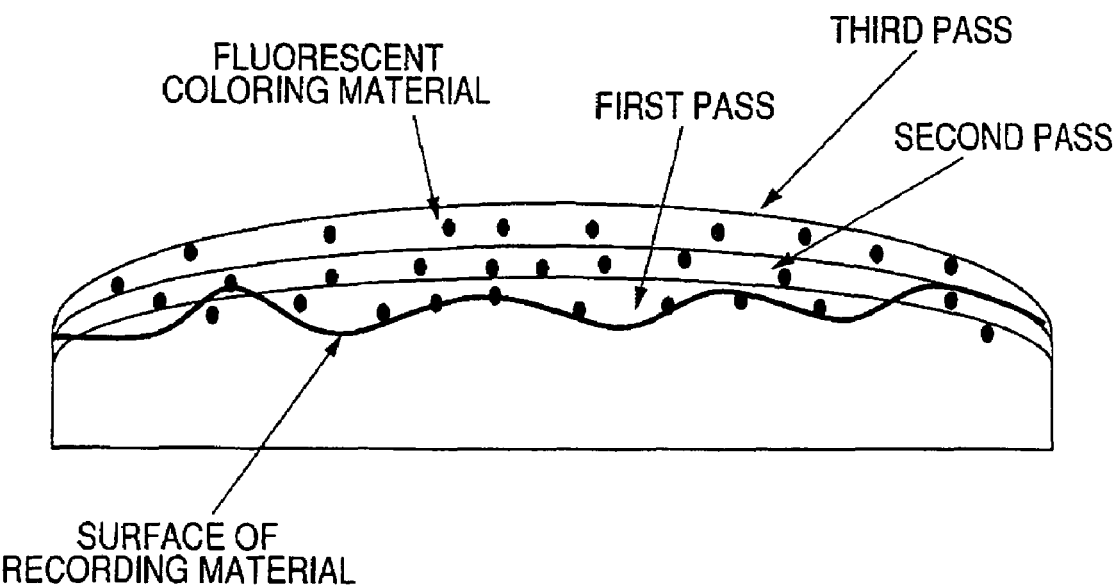
FIG. 16 is a drawing for explaining the concept of the present invention.

The recording method of the present invention involves superimposing fluorescent ink to form a recorded image. FIG. 14 shows the states of ink and a coloring material applied to a recording material in the case where a recorded image density is high. The coloring material cannot maintain a monomolecular state, and is in an aggregated state, thus the density is high, but fluorescence intensity reduces owing to the aggregation of the coloring material. In contrast, FIG. 15 shows the state of a recorded matter showing high fluorescence intensity. A coloring material does not aggregate, but the amount of the coloring material applied is small, and so high density cannot be maintained. On the other hand, FIG. 16 shows the state on a recording material in the present invention. FIG. 16 shows a state where ink having a fluorescent coloring material content at which no concentration quenching occurs is superimposed three times to form a recorded image. No aggregation of the coloring material occurs, and the amount of the coloring material applied to a recording material is large, and so high density can be maintained. As shown in FIG. 16, in the fluorescent recorded image recorded by means of the present invention, the coloring material applied to the recording material is sufficiently dissolved or dispersed to be stably present in a uniform state. Furthermore, the ink superimposed on the recording material is in the shape of a layer, and the fluorescent coloring material impinges on the recording material without aggregating to be recorded thereon. Therefore, in addition to high fluorescence intensity, an increase in density can be achieved by increasing the quantity of absorbed light through the application of a large amount of the coloring material to the recording material. In the present invention, the area at which two dots overlap preferably accounts for 50% or more of the dots. The effect of the present invention can be sufficiently obtained as long as the ratio of the area is in that range. In addition, in an ordinary one-pass process or multi-pass process, the ratio of the area at which dots are overlap is not in that range. Of course, the larger the area at which dots overlap, the more significantly the effect of the present invention can be obtained. In the present invention, the area at which dots overlap can be appropriately set in the range of 50% or more in consideration of a printing speed and the like.

According to the investigation made by the inventors of the present invention, in particular, as shown in FIG. 16, when respective ink droplets are superimposed on each other, a surfactant is used to form a vapor-liquid interface in order to prevent the aggregation of a coloring material, whereby the effect of the present invention can be further favorably expressed. According to the investigation made by the inventors of the present invention, in particular, when the content of a fluorescent coloring material in fluorescent ink is equal to or lower than the content at which concentration quenching for reducing fluorescence intensity is expressed, the fluorescence intensity of a fluorescent recorded matter recorded on a recording material is not affected by ink composition, and so a recorded matter having high fluorescence intensity can be obtained. That is, the foregoing state is preferable because fluorescence intensity is less susceptible to the evaporation, permeation and the like of an ink component, and hardly increases or decreases depending on ink composition. Furthermore, a system in which ink is supplied via a gap to a recording material to perform recording is employed for the recording method of the present invention. In contrast, in the case of a system in which ink is supplied in a pressurized state in contact with a recording material to perform recording such as a ball-point pen, the ink is squeezed into the recording material, so that the above-described mechanism of the present invention is hardly expressed.

A surfactant having an HLB value of 10 or less is suitably used for the present invention. This is because with an HLB value of 10 or less, the surfactant is oriented toward a vapor-liquid interface of ink droplets applied to a recording material, thus such an interface as shown in FIG. 16 is easily formed.

A nonionic surfactant having HLB of 13 or less is particularly suitably used in the present invention. In general, a surfactant having HLB in excess of 13 provides so strong hydrophilicity that such an interface as shown in FIG. C is hardly formed on the surface of a recording material when an image is formed, and hence the above-described mechanism by which the compatibility between high fluorescence intensity and high density is achieved by the formation of an interface of respective ink droplets is hardly expressed.

Specifically, the content of such a surfactant as cited above in the ink used in the present invention is preferably 0.5% by mass or more, or more preferably 1.0 to 20% by mass with respect to the total mass of the ink. When the content is less than 0.5% by mass, the effect of the expression of the above-described mechanism is less. When the content is larger than 20% by mass, a balance between printing qualities, for example, the balance between density, fixability and feathering (whisker-like exudation) tends to deteriorate.

Particularly preferable examples of a surfactant to be used in the present invention satisfying the above requirements include a compound represented by the following general formula (I) and compounds listed in the following formulae (II) to (VII).

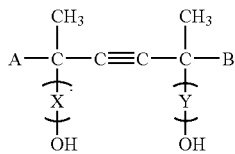
(I)

(In the general formula (I), A and B each independently represent $C_nH_{2n+1}$ (n represents an integer of 1 to 10), and X and Y each represent an ring-opening ethylene oxide unit and/or an ring-opening propylene oxide unit.)

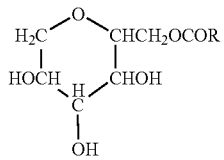
(II)

1,5-sorbitan ester

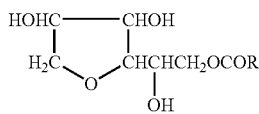
(III)

1,4-sorbitan ester

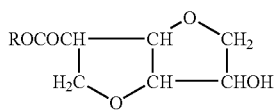
(IV)

Sorbide ester

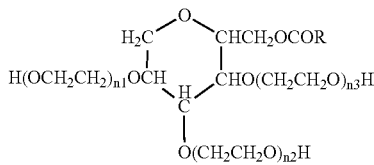
(V)

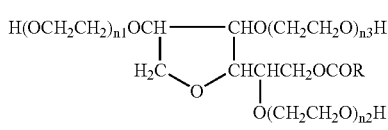
(VI)

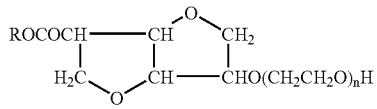
(VII)

R: an alkyl group of a fatty acid

Of those, compounds each represented by the general formula (I) are preferable. Of the compounds each represented by the general formula (I), a nonionic surfactant represented by the following formula (VIII) is particularly preferable.

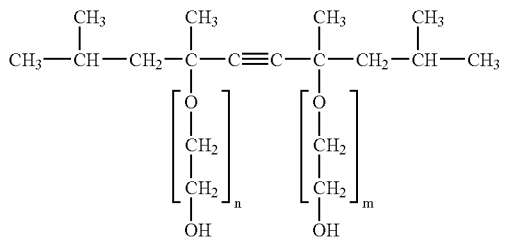
(VIII)

m and n each represent an integer

The ink used in the present invention further contains a compound showing fluorescence characteristics therein. The effect of the above-described mechanism is sufficiently expressed particularly in the case where a fluorescent coloring material is used in the ink. Furthermore, the ink used in the present invention tends to provide preferable results when it is aqueous ink using water as a liquid medium owing to the above-described reason. Therefore, a water-soluble fluorescent coloring which is soluble in water or a hydrophilic fluorescent coloring material is preferably used in the present invention.

The term "water-soluble or hydrophilic fluorescent coloring material" as referred to in the foregoing includes a compound or coloring material which itself is soluble in water (such as a fluorescent brightening agent or a fluorescent dye) and one obtained by: subjecting a fluorescent coloring material which is intrinsically hydrophobic to surface treatment so that the material is rendered hydrophilic; and, for example, emulsifying the resultant into water so that it seems as if the resultant were dissolved into water; provided, however, that the term does not hold true for an approach to dispersing a coloring material by using a resin as a dispersant such as pigment dispersion. This is because such an approach hardly expresses the effect of the above-described mechanism, and cannot be said to be very good selection for the reliability of ink. Hereinafter, all the states of such compound and fluorescent coloring material emitting fluorescence in a liquid medium as described above are referred to as "dissolved" unless otherwise specified.

A compound or fluorescent coloring material emitting fluorescence used as a constituent component of the ink of the present invention particularly preferably contains any one of the following atomic groups in its structure.

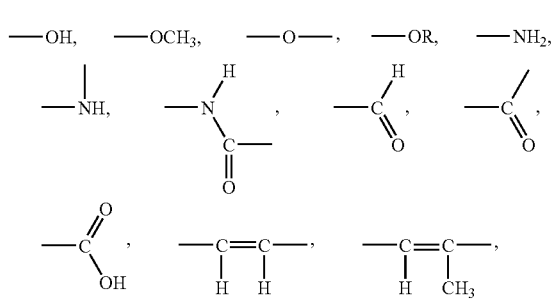

Examples of fluorescent coloring materials containing such atomic groups as described above in their structures are given below.

| Dye name | Structure | Color under daylight | fluorescent color |
|---|---|---|---|
| Brilliantsulfo-flavine FF (C.I.56205) | | Yellow | Green to Yellowish green |
| Basic yellow HG (C.I.46040) | | Yellow | Yellowish green to Yellow |
| Eosine (C.I.45380) | | Red | Yellow to orange |
| Rhodamine 6G (C.I.45160) | | Red | Yellow to orange |

| Dye name | Structure | Color under daylight | fluorescent color |
|---|---|---|---|
| Rhodamine B (C.I.45170) | 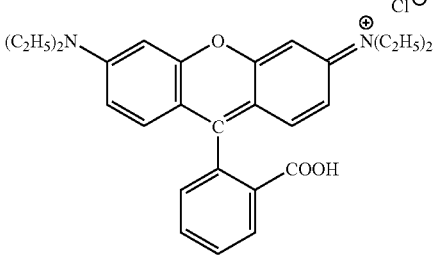 | Pink | Orange to Red |

| Pigment name | Structure |
|---|---|
| Lumogen L Yellow | 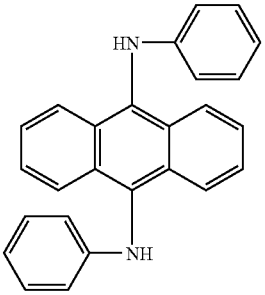 |
| Lumogen L Brilliant Yellow | 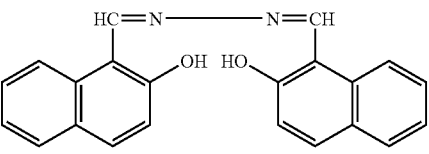 |
| Lumogen L Yellow Orange | 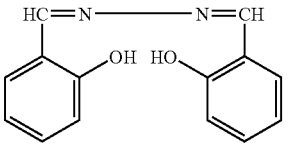 |
| Lumogen L Red Orange | 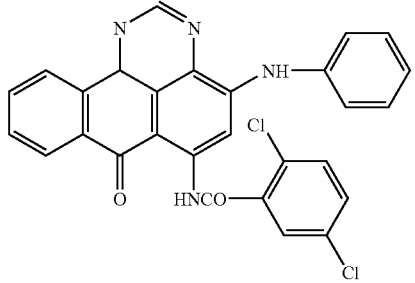 |

Other examples of fluorescent coloring materials include generally used fluorescent brightening agents.

A fluorescent coloring material has property with which fluorescence intensity starts to reduce when the content of the fluorescent coloring material in ink exceeds a certain value (this property is referred to as concentration quenching). Therefore, the content of any such fluorescent coloring material as cited above in ink is preferably equal to or lower than the content at which concentration quenching occurs.

In general, the content is preferably 2.0% by mass or less, or more preferably 1.0% by mass or less with respect to the total amount of the ink. In addition, when the largest emphasis is placed only on fluorescence characteristics, the content is particularly preferably 0.5% by mass or less.

The ink to be used in the present invention preferably further contains monohydric alcohol in terms of stability of the ink. The monohydric alcohol has an effect of mixing water and oil as in, for example, a draining agent for gasoline. This means that monohydric alcohol is preferably used in combination with ink in terms of stability of the ink in expressing the above-described mechanism.

Furthermore, monohydric alcohol has a good effect on evaporation or on permeation into a recording material when ink is applied to the recording material. Therefore, the monohydric alcohol is useful in expressing the effect of the present invention with improved effectiveness. The content of the monohydric alcohol in the ink to be used in the present invention is preferably 0.1 to 20% by mass, or more preferably 0.5 to 10% by mass with respect to the total mass of the ink. Specific examples of the monohydric alcohol that can be used as an ink component to be used in the present invention include ethanol, isopropyl alcohol, and n-butanol.

Furthermore, the ink used in the present invention preferably contains a water retention agent. A compound selected from urea and urea derivatives are preferably used as the water retention agent. The incorporation of urea or a urea derivative into ink improves the stability of the ink. That is, the incorporation of a compound selected from urea and urea derivatives is preferable for the stability of the ink.

Furthermore, for example, when a recording material is wood free paper or the like, the water retentivity of the wood free paper facilitates the expression of the effect of the mechanism of the present invention. That is, it is considered that water in a recording material is retained to retard the release of an ink component into the recording material or to the atmosphere, whereby the mechanism of the present invention can be improved.

A compound which is not cyclic is preferably used as a urea derivative to be used in the foregoing. For example, at least one kind selected from an alkyl derivative of urea and an ethylene oxide adduct of urea and/or a propylene oxide adduct thereof, or a compound derived by at least two of the above derivative groups is preferably appropriately selected and used; provided, however, that a compound to be used may be appropriately selected depending on the amounts and kinds of respective components constituting the ink. In addition, a water-soluble compound is preferably used. The amount of the compound to be used is not particularly limited, but is generally in the range of suitably 0.1 to 15% by mass, or more suitably 0.1 to 10% by mass with respect to the total mass of the ink.

The ink to be used in the present invention may contain any one of various additives such as a water-soluble organic solvent, a surfactant except those described above, a rust inhibitor, an antiseptic, an antifungal agent, an antioxidant, an anti-reduction agent, an evaporation accelerator, a chelating agent, a water-soluble polymer, and a pH adjustor as required. As described above, water is preferably used as a liquid medium to be used for preparing the ink to be used in the present invention. A mixture of water and a water-soluble organic solvent is more preferable. Specific examples of the water-soluble organic solvent to be used include: amides such as dimethylformamide and dimethylacetamide; ketones such as acetone; ethers such as tetrahydrofuran and dioxane; poly-alkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexane triol, thio diglycol, hexylene glycol, and diethylene glycol; glycerin; lower alkyl ethers of polyalcohols such as ethylene glycol monomethyl (or ethyl) ether, diethylene glycol monomethyl (or ethyl) ether, and triethylene glycol monomethyl (or ethyl) ether; cyclic amide compounds such as N-methyl-2-pyrrolidone, 1,3-dimethyl-2-imidazolidinone, triethanolamine, sulfolane, dimethylsulfoxide, 2-pyrrolidone, and ε-caprolactam; and imide compounds such as succinimide. A glycol compound which is a liquid at room temperature is particularly preferable as such a compound. The amount of the compound to be used is not particularly limited, but is generally in the range of suitably 0.1 to 15% by mass, or more suitably 0.1 to 10% by mass with respect to the total mass of the ink.

The total content of such water-soluble organic solvents as described above is generally in the range of preferably 1% to 40%, or more preferably 3% to 30% with respect to the total mass of the ink. In addition, a water content in the ink is in the range of 30 to 95% by mass. A water content of less than 30% by mass is not preferable because the solubility and the like of a coloring material deteriorate and the viscosity of the ink also increases. On the other hand, a water content in excess of 95% by mass cannot sufficiently satisfy sticking properties because the amount of an evaporating component is excessively large.

The ink to be used in the present invention may further contain a coloring material showing no fluorescence for color matching in addition to a fluorescent coloring material. A coloring material which is soluble in water is preferably used in terms of the stability of the ink (as in the case of the fluorescent coloring material, in this case as well, a coloring material which is emulsified so that it seems as if the coloring material itself were dissolved is also included). Taking into account the water-resisting property of a recorded matter formed by means of the ink to be used in the present invention, a coloring material that directly dyes a recording material (a direct dye or the like) is preferably used in consideration of the stability of ink. Furthermore, a coloring material having an azo group in its structure is favorable. In addition, a coloring material with a structure having a carboxyl group or a salt thereof is preferably used as a coloring material showing no fluorescence. Furthermore, a coloring material having only a carboxyl group or a salt thereof as a hydrophilic group is preferably used. Since a carboxyl group has a weaker affinity for water than that of a sulfone group, the water-resisting property of a recorded matter formed by means of the ink to be used in the present invention can be improved.

Furthermore, the content of a coloring material showing no fluorescence in the ink to be used in the present invention is preferably equal to or lower than that of the above-described fluorescent coloring material. In addition, a large amount of fluorescent coloring material cannot be used in the ink owing to concentration quenching. The reason therefore is that when using a small amount of fluorescent coloring material, a recorded state is easy to retain and recorded contents is prevented from completely disappearing even if a recorded matter is distinguished by the eyes or brought into contact with water to lose fluorescence. It should be noted that the content must be appropriately selected depending on a balance between the expressed state of fluorescence and color developability on a recorded matter formed by means of a fluorescent coloring material when a coloring material showing no fluorescence is selected.

Specific examples of a coloring material showing no fluorescence include, but not limited to: coloring materials each having a dimer structure such as Direct Black 168, Direct Black 154, a disazo coloring material having strong substantivity, a trisazo coloring material, Direct Yellow 142, Direct Yellow 86, Direct Red 227, and Direct Red 80; gold-containing coloring materials such as Direct Blue 199; and coloring materials represented by the following general formulae (A) to (C) in free acid form.

Coloring material represented by the following general formula (A) in free acid form:

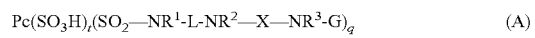

$$Pc(SO_3H)_t(SO_2-NR^1-L-NR^2-X-NR^3-G)_q \qquad (A)$$

(In the general formula (A), Pc represents a gold-containing phthalocyanine nucleus, $R^1$, $R^2$, and $R^3$ each independently represent a hydrogen atom, an alkyl group, a substituted alkyl group, an alkenyl group, a substituted alkenyl group, an aralkyl group, or a substituted aralkyl group, L represents a divalent organic connecting group, and X represents a carbonyl group or a structure represented by any one of the following formulae (2) to (4).

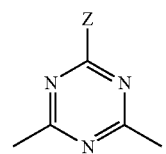

(2)

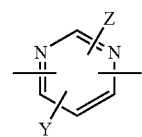

(3)

-continued

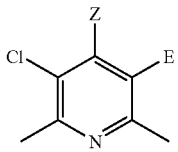
(4)

(Z's in the formulae (2) to (4) each independently represent $NR^4R^5$, $SR^6$, or $OR^6$, Y in the formula (3) represents a hydrogen atom, Cl, Z, $SR^7$, or $OR^7$, E in the formula (4) represents Cl or CN, $R^4$, $R^5$, $R^6$, and $R^7$ in the foregoing each independently represent a hydrogen atom, an alkyl group, a substituted alkyl group, an aryl group, a substituted aryl group, an aralkyl group, or a substituted aralkyl group, and $R^4$ and $R^5$ may form a five-membered or six-membered ring together with a nitrogen atom.)

G in the general formula (A) represents a colorless organic residue substituted by one or two COSH's or COOH's, and t+q is 3 or 4.)

Examples of the compounds each represented by the general formula (A) are given below.

Coloring material represented by the following general formula (B) in free acid form:

(B)

(In the general formula (B), J represents the following formula.

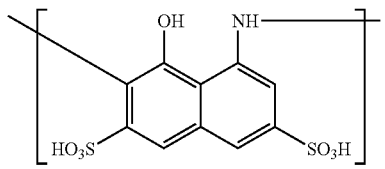

$Ar^1$ and $Ar^2$ in the general formula (B) each independently represent an aryl group or a substituted aryl group, and at least one of $Ar^1$ and Ar2 has one or more substituents chosen from COOH and COSH. In addition, R1 and R2 each independently represent a hydrogen atom, an alkyl group, a substituted alkyl group, an alkenyl group, or a substituted alkenyl group, L represents a divalent organic connecting group, and n represents 0 or 1. X represents a carbonyl group or a structure represented by any one of the following formulae (2) to (4). Z's in the formulae (2) to (4) each independently represent $NR^3R^4$, $SR^5$, or $OR^5$, Y in the formula (3) represents a hydrogen atom, Cl, Z, $SR^6$, or $OR^6$, E in the formula (4) represents Cl or CN, $R^3$, $R^4$, $R^5$, and $R^6$ in the foregoing each independently represent a hydrogen atom, an alkyl group, a substituted alkyl group, an alkenyl group, a substituted alkenyl group, an aryl group, a substituted aryl group, an aralkyl group, or a substituted aralkyl group, and $R^3$ or $R^4$ may form a five-membered or six-membered ring together with a nitrogen atom.) A compound represented by the general formula (B) has at least the same number of groups chosen from COOH and COSH as the number of $SO_3H$'s.)

Examples of the compounds each represented by the general formula (B) are given below.

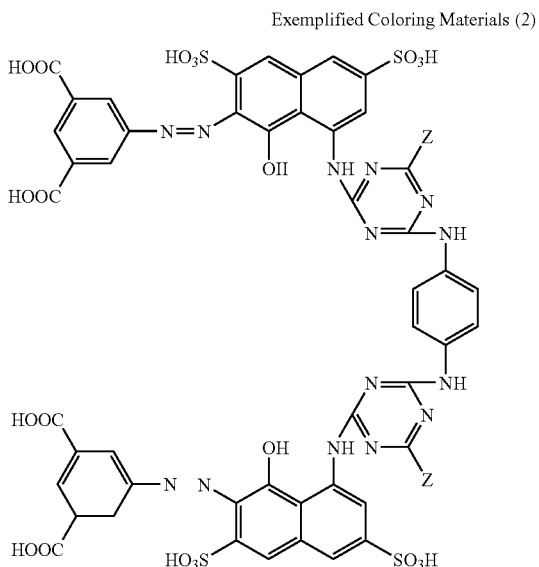

Exemplified Coloring Materials (2)

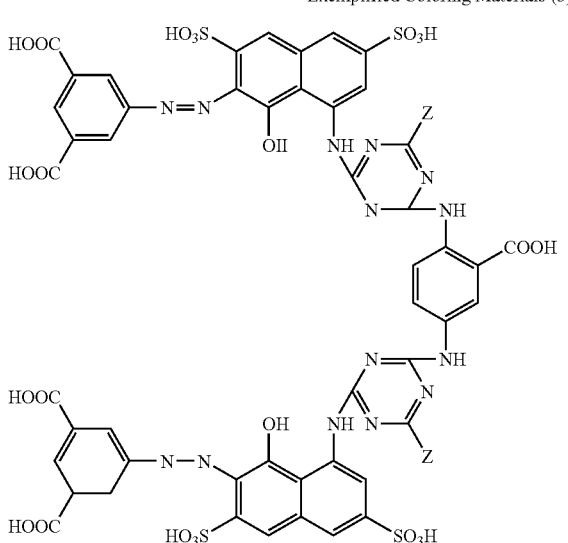

Exemplified Coloring Materials (3)

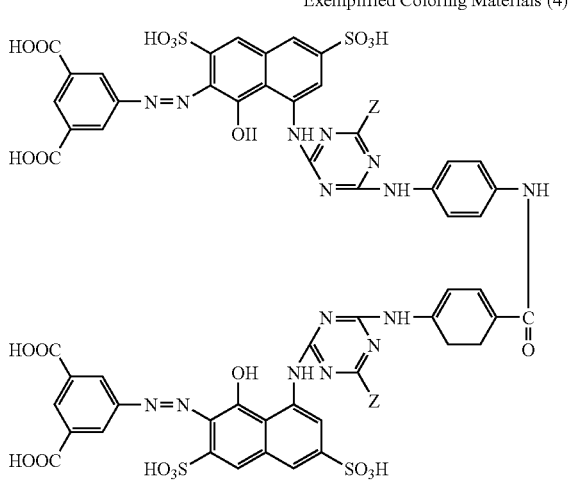

Exemplified Coloring Materials (4)

Exemplified Coloring Materials (5)

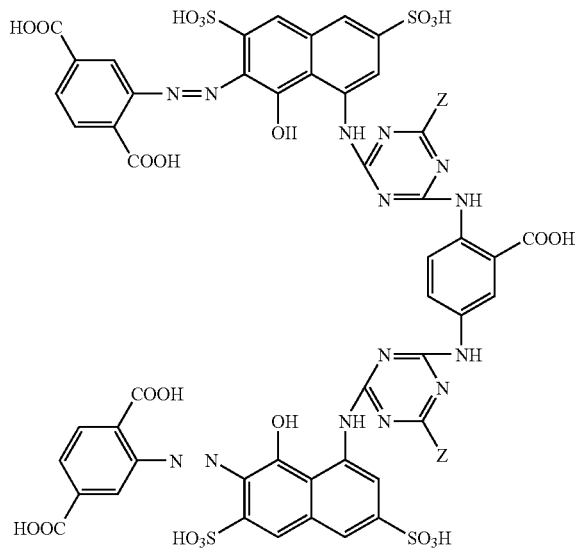

Coloring material represented by the following general formula (C) in free acid form:

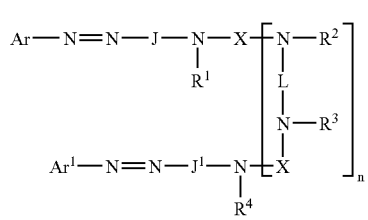

(In the general formula (C), Ar and Ar$^1$ each independently represent an aryl group or a substituted aryl group, and at least one of Ar and Ar$^1$ has a substituent selected from the group consisting of a sulfone group, a carboxyl group, and a thiocarboxyl group. J and J$^1$ each independently represent a structure represented by any one of the following formulae (2) to (4).

(2)

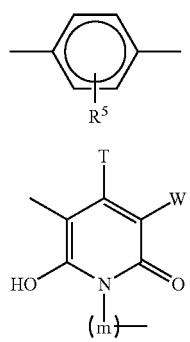

(3)

(4)

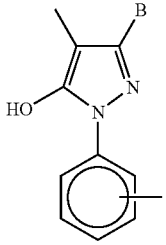

(In the formula (2), R$^5$ is selected from a hydrogen atom, an alkyl group, a substituted alkyl group, an alkoxyl group, a halogen atom, CN, a ureido group, and NHCOR$^6$. The R$^6$ is selected from a hydrogen atom, an alkyl group, a substituted alkyl group, an aryl group, a substituted aryl group, an aralkyl group, and a substituted aralkyl group. In the formula (3), T represents an alkyl group, W is selected from a hydrogen atom, CN, CONR$^{10}$R$^{11}$, a pyridium group, and a carboxyl group, and m represents an alkylene chain having 2 to 8 carbon atoms. R$^{10}$ and R$^{11}$ in the foregoing are each independently selected from a hydrogen atom, an alkyl group, and a substituted alkyl group. B in the formula (4) is selected from a hydrogen atom, an alkyl group, and a carboxyl group.

R$^1$, R$^2$, R$^3$, and R$^4$ in the general formula (C) are each independently selected from a hydrogen atom, an alkyl group, and a substituted alkyl group, L represents a divalent organic connecting group, n represents 0 or 1, and X represents a carbonyl group or a structure represented by any one of the following formulae (5), (6), and (7).

(5)

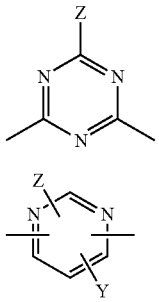

(6)

(7)

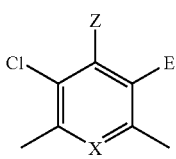

(Z's in the formulae (5) to (7) are each independently selected from OR$^7$, SR$^7$, and NR$^8$R$^9$, Y in the formula (6) is selected from a hydrogen atom, Cl, CN, and Z, E in the formula (7) is chosen from Cl and CN. R$^7$, R$^8$, and R$^9$ in the foregoing are each independently selected from a hydrogen atom, an alkenyl group, a substituted alkenyl group, an alkyl group, a substituted alkyl group, an aryl group, a substituted aryl group, an aralkyl group, and a substituted aralkyl group, and R$^8$ or R$^9$ may further form a five-membered or six-membered ring together with a nitrogen atom bound thereto.) When a compound represented by the general formula (C) has no sulfone group, the compound has at least two groups chosen from a carboxyl group and a thiocarboxyl group, and the compound represented by the general formula (C) has at least the same number of groups chosen from a carboxyl group and a thiocarboxyl group as the number of sulfone groups.)

Examples of the compounds each represented by the general formula (C) are given below.
Exemplified Coloring Materials (6)
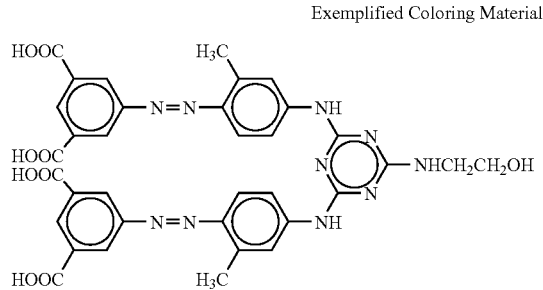
Exemplified Coloring Materials (7)
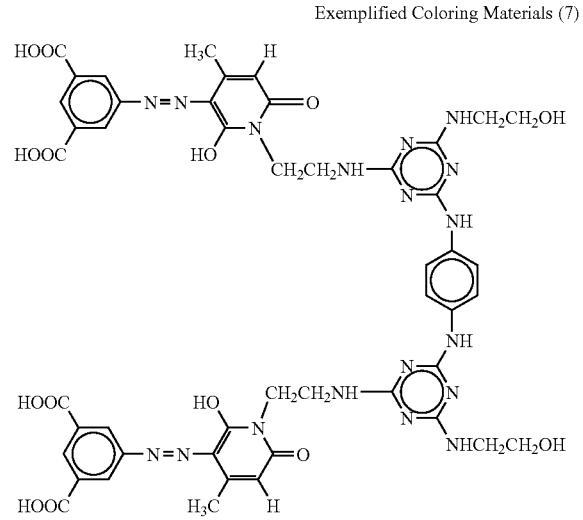
Exemplified Coloring Materials (8)
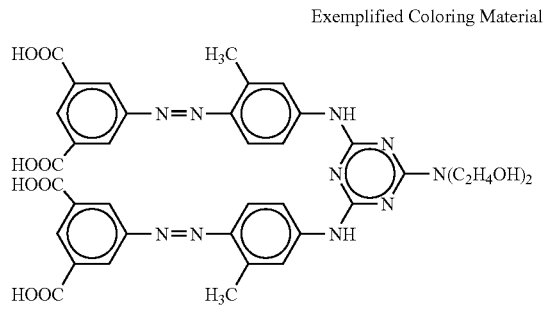
Exemplified Coloring Materials (9)
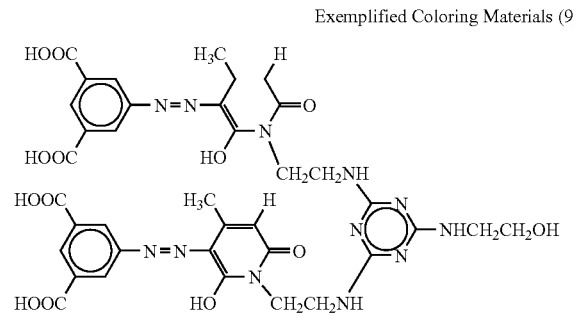
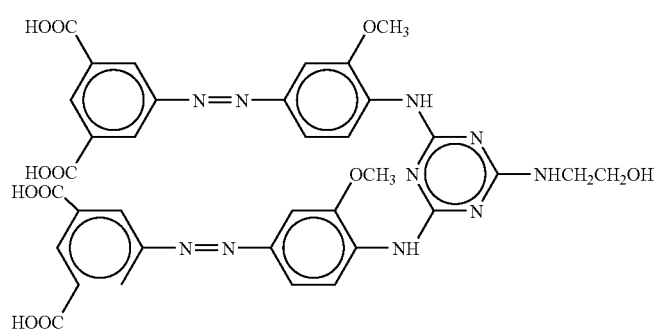
Exemplified Coloring Materials (10)
Exemplified Coloring Materials (11)
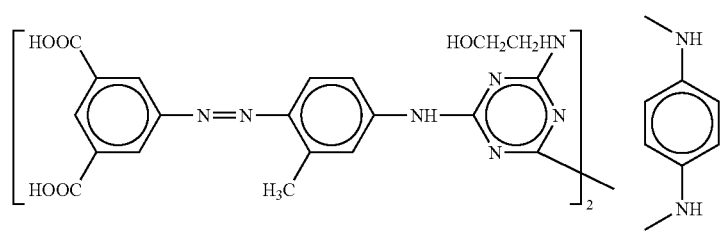

The amount of such a coloring material showing no fluorescence as described above to be used is not particularly limited, but is generally in the range of suitably 0.1 to 15% by mass, or more suitably 0.1 to 10% by mass with respect to the total mass of the ink.

The ink to be used in the present invention preferably has a surface tension of 40 dyn/cm or less. This is because, for example, a liquid droplet preferably spreads after recording for the expression of the effect due to the above-described mechanism. In addition, the pH of the ink to be used in the present invention is preferably 8 or more in terms of the stability of the ink.

Furthermore, in the ink to be used in the present invention, an alkali metal ion and an ammonium ion are preferably used in combination. When the ink is used for ink-jet recording, the stability and ejection property of the ink become good in the case where both the ions are used in combination. Examples of the alkali metal ion include $Li^+$, $Na^+$, and $K^+$. The ink to be used in the present invention is preferably an ink system from which a coloring material and an additive are removed and which is adjusted to be nonionic. The content of a fluorescent coloring material in the ink to be used in the present invention is preferably equal to or higher than the content at which maximum fluorescence intensity is shown in the ink for increasing the fluorescence intensity of an image. The reason for this is probably as follows. When recording is performed on a recording material by using an aqueous ink, an apparent coloring material concentration is reduced owing to, for example, the exudation and permeation of the ink. Therefore, good color development can be maintained in a selected recording material when recording is performed on the recording material by using the ink constituted in this way.

Here, the "multiple fluorescent dyes" applicable to the present invention will be described below. The "multiple fluorescent dyes" to be described below is a technique for significantly improving desired fluorescence intensity, depending on the relationship between the fluorescence intensity of a first fluorescent coloring material emitting fluorescence in a standard fluorescence wavelength region (for example, 580 nm to 620 nm) with a standard excitation wavelength and any other fluorescent coloring material (hereinafter, referred to as the second coloring material).

For example, the inventors of the present invention have investigated the phenomenon in which weak fluorescent emission with UV excitation is observed on the recorded image although the fluorescent dye AR52 mentioned in the above "Background Art" emits fluorescence having wavelengths in a red region sufficiently even in aqueous ink which absorbs UV light. As a result of such investigation into the phenomenon, it was judged that the excitation wavelengths for allowing the AR52 to emit red fluorescence are not only in the UV region but also in the visible-light region in a large amount and are influenced by a fixing state of a fluorescent dye in a target recording medium.

Therefore, technical analyses were conducted concerning how to provide a large quantity of light at an excitation wavelength for emitting the red as much as possible or how to make the fixing state of a dye as a recorded image effective in the fluorescent emission. Furthermore, when the first coloring material is AR52 as described above, the ink containing 0.01% by mass or less of AR52 from which water content has evaporated also shows sufficient fluorescence intensity as an individual characteristic. However, there are additional matters, which should be taken into consideration, including: a problem in which the coloring material is wastefully consumed inside the paper without being fixed on the surface fibers of paper or an envelope as a recording medium for the formation of an image; and a problem of concentration quenching in which the fluorescence intensity of the coloring material decreases with the increasing amount of each of the first and second coloring materials in the ink. On the other hand, the matter in which the energy to be supplied is limited to the standard excitation wavelength is also taken into consideration. Other analyses will be understood from the following description.

Therefore, the multiple fluorescent coloring materials of the present invention solve at least one of the following problems (preferably, two or more problems) to bring the fluorescence intensity to a higher level than the state of the art. A first object of the multiple fluorescent coloring materials of the present invention is to provide a print ink capable of increasing the fluorescence intensity at a standard emission wavelength due to the fact that the energy efficiency is improved through focusing attention on the correlation between the fluorescent emission of a second coloring material generated by applying a standard excitation wavelength and the excitation wavelength of a first coloring material for obtaining the standard emission wavelength (hereinafter, referred to as a standard fluorescence wavelength of a single wavelength or a wavelength interval).

A second object of the multiple fluorescent coloring materials of the present invention is to provide a print ink capable of increasing the fluorescence intensity at a standard emission wavelength due to the fact that the energy efficiency is enhanced significantly through focusing attention on the absorption spectrum of a first coloring material and the fluorescent emission of a second coloring material generated by applying the standard excitation wavelength.

A third object of the multiple fluorescent coloring materials of the present invention is to provide a print ink capable of increasing the fluorescence intensity thereof at a standard emission wavelength on the basis of the knowledge obtained by analyzing a structural difference between fluorescent dyes (i.e., the amounts of the respective fluorescent dyes to be added can be increased by reasonably preventing the fluorescent dyes from associating).

A fourth object of the multiple fluorescent coloring materials of the present invention is to provide a print ink capable of increasing the fluorescence intensity at a standard emission wavelength through focusing attention on the fact that the fluorescent emission of the second coloring material generated by applying the standard excitation wavelength is concerned with the excitation wavelength characteristics for obtaining the standard emission fluorescence wavelength of the first coloring material, in addition to the third object.

A fifth object of the multiple fluorescent coloring materials of the present invention is to provide a print ink capable of more stably increasing the fluorescence intensity at a standard emission wavelength as the characteristics of the ink itself that contains multiple fluorescent coloring materials.

A sixth object of the multiple fluorescent coloring materials of the present invention is to provide a print ink capable of increasing the fluorescence intensity at a standard emission wavelength without substantially depending on the knowledge obtained by analyzing an image to be formed, that is, the kind or characteristics of a recording medium on which an image is to be formed. A seventh object of the multiple fluorescent coloring materials of the present invention is to provide a print ink capable of increasing the fluorescence intensity at a standard emission wavelength due to the fact that the energy efficiency thereof is improved through focusing attention on the correlation between the excitation characteristics of the first coloring material and the absorption spectrum of the second coloring material, in addition to the first object.

Other objects of the multiple fluorescent coloring materials of the present invention will become apparent from the following description.

The multiple fluorescent coloring materials of the present invention for attaining the above objects include the following aspects. For collectively terming the relationship between wavelengths in the multiple fluorescent coloring materials of the present invention, the fluorescent emission wavelength region (see FIG. 3 described later) of a second fluorescent coloring material includes at least the peak wavelength region (see FIG. 2 described later) of the excitation wavelength characteristics for obtaining the standard emission wavelength (e.g., 600 nm) of a first fluorescent coloring material and/or the absorption spectrum of visible light of the first fluorescent coloring material (see the lower side of FIG. 6 described later).

First of all, according to a first aspect of the multiple fluorescent coloring materials of the present invention for attaining at least the first object, a print ink is provided containing: a first fluorescent coloring material that generates emission at a standard fluorescence wavelength used for measurement or determination among wavelengths resulting from fluorescent emission due to the application of a standard excitation wavelength; and a second fluorescent coloring material that emits fluorescence at the standard excitation wavelength, wherein the emission wavelength region of the second fluorescent coloring material substantially includes at least a peak wavelength region that corresponds to a peak region adjacent to the standard fluorescence wavelength in an excitation wavelength region for obtaining the emission at the standard fluorescence wavelength of the first fluorescent coloring material in the ink. The expression "a peak wavelength region that corresponds to a peak region adjacent to the standard fluorescence wavelength" of the fluorescent emission from the first fluorescent coloring material of the multiple fluorescent coloring materials of the present invention has a practical meaning in consideration of the energy conversion efficiency thereof. In other words, in the "excitation wavelength spectrum for obtaining a standard fluorescence wavelength" of the first fluorescent coloring material, a region having an intensity of 100 or more in a spectrum having a peak adjacent to the standard fluorescence wavelength is defined as a peak region, and a wavelength that provides this region is defined as a peak wavelength region.

The standard excitation wavelength is preferably 254 nm, and the peak wavelength region is preferably in the range of 430 nm to 600 nm. The emission wavelength region of the second fluorescent coloring material preferably includes a wavelength of 600 nm as the standard fluorescence wavelength and preferably has an emission wavelength ranging from 425 nm to 600 nm. Furthermore, in the ink according to the first aspect, the first fluorescent coloring material preferably has a peak region of the absorption spectrum in a visible light region, and the wavelength region of the fluorescent emission of the second fluorescent coloring material preferably includes a region of wavelengths shorter than the peak region of the absorption spectrum.

According to a second aspect of the multiple fluorescent coloring material of the present invention capable of attaining at least the second object, a print ink is provided containing: a first fluorescent coloring material that generates emission at a standard fluorescence wavelength used for measurement or determination among wavelengths resulting from fluorescent emission due to the application of a standard excitation wavelength; and a second fluorescent coloring material that emits fluorescence by means of the standard excitation wavelength, wherein the emission wavelength region of the second fluorescent coloring material is at least in the wavelength region including a main absorption wavelength region in the light absorption spectrum of the first fluorescent coloring material in an excitation wavelength region for obtaining the emission at the standard fluorescence wavelength of the first fluorescent coloring material in the ink.

In the ink according to the second aspect, the main absorption wavelength region of the first fluorescent coloring material is preferably in the range of 500 nm to 590 nm, and the main emission wavelength region of the second fluorescent coloring material is preferably in the range of 450 nm to 600 nm. Furthermore, in the ink according to each of the first and second aspects, the second fluorescent coloring material is preferably a coloring material having a structure with multiple fluorescence emission groups.

According to a third aspect of the multiple fluorescent coloring materials of the present invention capable of attaining at least the third object, a print ink is provided containing: a first fluorescent coloring material that generates emission at a standard fluorescence wavelength used for measurement or determination among wavelengths resulting from fluorescent emission due to the application of a standard excitation wavelength; and a second fluorescent coloring material for emitting fluorescence by means of the standard excitation wavelength and for enhancing emission intensity at the standard fluorescence wavelength, wherein the second fluorescent coloring material has a structure with multiple fluorescence emission groups. In the ink according to the third aspect, the emission wavelength region of the second fluorescent coloring material is preferably at least in the excitation wavelength region for obtaining the standard fluorescence wavelength of the first fluorescent coloring material in the ink.

According to a fourth aspect of the multiple fluorescent coloring materials of the present invention capable of attaining at least the fourth object, a print ink is provided containing: a first fluorescent coloring material that generates emission at a standard fluorescence wavelength to be used for measurement or determination among wavelengths resulting from fluorescent emission due to the application of a standard excitation wavelength; and a second fluorescent coloring material that emits fluorescence by means of the standard excitation wavelength, wherein: the second fluorescent coloring material has a structure with multiple fluorescence emission groups; and the emission wavelength region of the second fluorescent coloring material has a wavelength region common to at least a part of an excitation wavelength region for obtaining the emission at the standard fluorescence wavelength of the first fluorescent coloring material in the ink. In the ink according to each of the third and fourth aspects, each of the multiple fluorescence emission groups in the second fluorescent coloring material preferably has a basic structure for brightening fluorescence. In addition, the second fluorescent coloring material preferably has multiple sulfone groups.

In the ink according to any one of the first to fourth aspects, each of the multiple fluorescence emission groups in the second fluorescent coloring material is preferably a dimer. Meanwhile, in the first to fourth aspects, the second fluorescent coloring material is preferably a direct dye.

Furthermore, the print ink according to each of the third and fourth aspects is preferably an aqueous ink in which the emission spectrum of the ink, which emits fluorescence by means of the standard excitation wavelength when the aqueous print ink is in a water content evaporated ink state and/or a printed image state, exhibits a first peak that involves emission at the standard fluorescence wavelength and a second peak in an excitation wavelength region for obtaining the emission at the standard fluorescence wavelength of the first fluorescent coloring material in the ink.

According to a fifth aspect of the multiple fluorescent coloring materials of the present invention for attaining at least the fifth object, an aqueous print ink is provided containing: a first fluorescent coloring material that generates emission at a standard fluorescence wavelength to be used for measurement or determination among wavelengths resulting from fluorescent emission due to the application of a standard excitation wavelength; and a second fluorescent coloring material that emits fluorescence by means of the standard excitation wavelength, wherein the emission spectrum of the ink, which emits fluorescence by means of the standard excitation wavelength when the aqueous print ink is in a water content evaporated ink state and/or a printed image state, exhibits a first peak that involve the emission at the standard fluorescence wavelength and a second peak in an excitation wavelength region for obtaining the emission at the standard fluorescence wavelength of the first fluorescent coloring material in the ink. In the ink according to the second aspect, preferably, the second fluorescent coloring material has a structure with multiple fluorescence emission groups.

According to a sixth aspect of the multiple fluorescent coloring materials of the present invention for attaining at least the sixth object, a print ink is provided containing: a first fluorescent dye that generates emission at a standard fluorescence wavelength to be used for measurement or determination among wavelengths resulting from fluorescent emission due to the application of a standard excitation wavelength; a second fluorescent dye for emitting fluorescence by means of the standard excitation wavelength and for enhancing emission intensity at the standard fluorescence wavelength; and a solvent including a first solvent that shows the relatively high solubility of the first fluorescent dye, and the low solubility of the second fluorescent dye, and a second solvent that shows the high solubility of the second fluorescent dye and compatibility with the first solvent.

In the ink according to the sixth aspect, each of the first fluorescent dye and the second fluorescent dye preferably has a sulfone group. In addition, preferably, the emission wavelength region of the second fluorescent dye substantially contains a peak wavelength region corresponding to a peak region adjacent to the standard fluorescence wavelength in an excitation wavelength region for obtaining the standard fluorescence wavelength of the first fluorescent dye in the ink. In the ink according to the sixth aspect, furthermore, the emission wavelength region of the second fluorescent dye is preferably in a wavelength region other than a main absorption wavelength region in the light absorption spectrum of the first fluorescent dye in the excitation wavelength region for obtaining the standard fluorescence wavelength of the first fluorescent dye in the ink. On the other hand, the print ink according to the sixth aspect is preferably an aqueous ink, where the emission spectrum of the ink, which emits fluorescence by means of the standard excitation wavelength when the aqueous print ink is in a water content evaporated ink state and/or a printed image state, exhibits a first peak that involves the emission at the standard fluorescence wavelength and a second peak in the excitation wavelength region for obtaining the emission at the standard fluorescence wavelength of the first fluorescent coloring material in the ink.

According to a seventh aspect of the multiple fluorescent coloring materials of the present invention capable of attaining at least the seventh object, a print ink is provided containing: a first fluorescent coloring material that generates emission at a standard fluorescence wavelength to be used for measurement or determination among wavelengths resulting from fluorescent emission due to the application of a standard excitation wavelength; and a second fluorescent coloring material that emits fluorescence by means of the standard excitation wavelength, wherein: the emission wavelength region of the second fluorescent coloring material includes at least a peak wavelength region corresponding to a peak region adjacent to the standard fluorescence wavelength in an excitation wavelength region for obtaining the emission at the standard fluorescence wavelength of the first fluorescent coloring material in the ink; and a main absorption wavelength region in the light absorption spectrum of the second fluorescent coloring material is further in a shorter wavelength region than the excitation wavelength region for obtaining the emission at the standard fluorescence wavelength of the first fluorescent coloring material. In the ink according to the seventh aspect, preferably, the standard excitation wavelength is 254 nm, the peak wavelength region of the first fluorescent coloring material is in the range of 430 nm to 600 nm, and the absorption wavelength region of the second fluorescent coloring material is 440 nm or less.

In the ink according to any one of the first to five aspects and the seventh aspect, more preferably, the print ink contains a first solvent showing the relatively high solubility of the first fluorescent dye and the low solubility of the second fluorescent dye, a second solvent showing the high solubility of the second fluorescent dye and compatibility with the first solvent, and a third solvent showing no compatibility with the second solvent and dissolving the second fluorescent dye. This solvent condition can further improve the fluorescence intensities of the different fluorescent coloring materials of the multiple fluorescent coloring materials of the present invention.

Using each of the print inks in ink-jet recording can provide a recorded image having at least excellent fluorescence intensity. An ink-jet recording method of the multiple fluorescent coloring materials of the present invention, which exerts such an advantage, is an ink-jet recording method including ejecting ink through an ejection orifice and adhering the ink to a recording medium, thereby performing recording, wherein the ink is the print ink according to any one of the above aspects.

The multiple fluorescent coloring materials of the present invention relate to a print ink, which contains a first fluorescent coloring material that generates emission at a standard fluorescence wavelength to be used for measurement or determination among wavelengths resulting from fluorescent emission due to the application a standard excitation wavelength, and define the relation of the first fluorescent coloring material with a second fluorescent coloring material that emits fluorescence by means of the standard excitation wavelength as defined in each of the inventions.

When the image was determined as a recorded image, the best mode of the print ink according to the multiple fluorescent coloring materials of the present invention at the present moment (described below) was able to increase a PMU level (measured using an LM-2C luminance meter ("LM 2C")) described in U.S. Pat. No. 6,176,908 by a factor of at least two (or three when the ink of the multiple fluorescent coloring materials of the present invention with the solvent selected as described above was used) than the recorded image obtained by the conventional fluorescent ink.

Hereinafter, the print ink of the present invention will be described with reference to the accompanying drawings. Unless specified as a recorded image or a printed image, the results are expressed as measurement data obtained from evaporated ink prepared by vaporizing the water content and dispersing a coloring material in an organic solvent. The print ink according to each aspect of the multiple fluorescent coloring materials of the present invention contains a first fluorescent coloring material that generates emission at a standard fluorescence wavelength to be used for measurement or determination among wavelengths resulting from fluorescent emission due to the application of a standard excitation wavelength, a second fluorescent coloring material that emits fluorescence by means of the standard excitation wavelength, and a liquid medium for dissolving or dispersing these materials therein.

The first and second fluorescent coloring materials of the multiple fluorescent coloring materials of the present invention may be those satisfying the constitution of a print ink according to each of the aspects, irrespective of dyes and pigments. Of those, the dyes are preferable for achieving a large rate of ink bleeding and increased fluorescence intensity of ink on the recording medium. Specific examples of the dyes include: C.I. Basic Red 1, 2, 9, 12, 13, 14, and 17; C.I. Basic Violet 1, 3, 7, 10, 11:1, and 14; C.I. Acid Yellow 73, 184, and 250; C.I. Acid Red 51, 52, 92, and 94; C.I. Direct Yellow 11, 24, 26, 87, 100, and 147; C.I. Direct Orange 26, 29, 29:1, and 46; and C.I Direct Red 1, 13, 17, 239, 240, 242, and 254.

The amounts of the respective first and second fluorescent coloring materials to be used in the multiple fluorescent coloring materials of the present invention are represented as the sum thereof. The sum of those materials is practically preferably in the range of 0.01% by mass or more and 15% by mass or less, or more preferably in the range of 0.05% by mass or more and 10% by mass or less with respect to the total amount of ink. Furthermore, depending on the kinds of fluorescent coloring materials, the fluorescence intensity sufficient for a printed image may not be obtained when the sum of the fluorescent coloring materials is 0.01% by mass or less. In addition, when those materials are used in an ink-jet system, the ejection properties thereof may be affected when the sum of the above materials is 15% by mass or more. Practically, it is preferable that the amount of the first fluorescent coloring material is selected from the range of 0.01 to 1% by mass. Furthermore, the amount of the second fluorescent coloring material is preferably higher than that of the first fluorescent coloring material in the ink for further improving excitation energy efficiency.

In addition, the fluorescent dyes mentioned above include a fluorescent dye known as one causing a phenomenon in which the fluorescence weakens when the concentration of the dye is equal to or greater than a certain concentration. Such a kind of fluorescent dye has a concentration region that allows the dye to express strong fluorescence intensity. In this case, it is preferable to use the dye at the concentration region that allows the dye to express strong fluorescence intensity.

As a method of improving the fluorescence intensity, it is preferable that each of the first and second fluorescent coloring materials adopt at least one of Embodiment 1 to Embodiment 3 described later. A combination of the first and second fluorescent coloring materials corresponding to the embodiments can be arbitrarily selected from the coloring materials described above.

In the multiple fluorescent coloring materials of the present invention, the most preferable example of the combination of multiple fluorescent coloring materials is a combination of C.I. Acid Red 52 as the first fluorescent coloring material and the under-described water-soluble fluorescent coloring material A as the second fluorescent coloring material. In the following description, the standard emission wavelength to be used for measurement or determination is set at 600 nm. However, all the wavelengths may be used as far as the wavelengths are in the range of 580 nm or more and 620 nm or less, or any wavelengths in this region may be used.

As shown in FIG. 1, the fluorescent emission of AR52 as the first fluorescent coloring material with a standard excitation wavelength of 254 nm can be observed in a wide fluorescent emission region ranging from 550 nm to about 675 nm with a peak wavelength of 600 nm. In other words, the single fluorescent coloring material can independently emit fluorescence at a standard emission wavelength of 600 nm as defined above, and also the single fluorescent coloring material can emit fluorescence at all the wavelengths in the range of 580 nm or more and 620 nm or less. Furthermore, as shown in the lower graph of FIG. 6, the absorption spectrum of AR52 as the first fluorescent coloring material with wavelengths of visible light ranges from 460 nm to 610 nm with a peak wavelength of 565 nm.

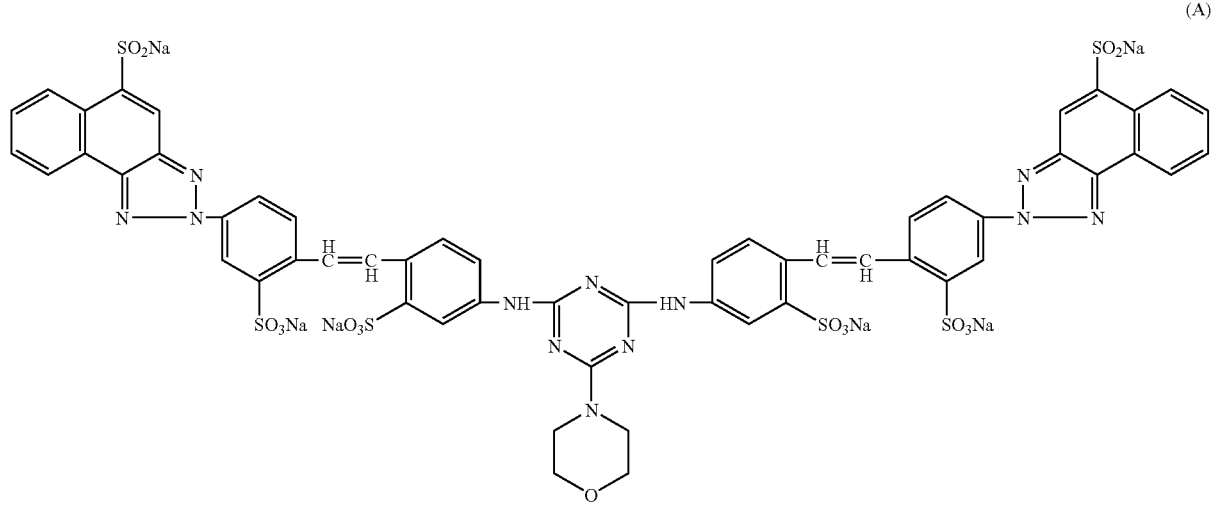

(A)

Figure 3:
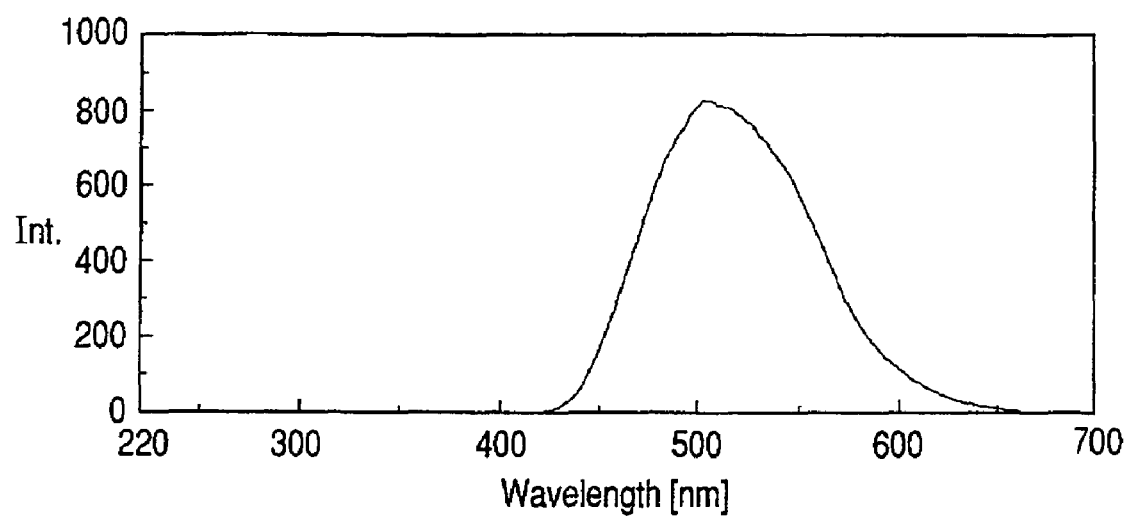
FIG. 3 is a diagram showing the fluorescent emission spectrum of a compound (A) at an excitation wavelength of 254 nm.

The water-soluble fluorescent coloring material A has multiple dimeric fluorescence emission groups. Thus, the water-soluble fluorescent coloring material A has an association-preventing function, and also the fluorescence intensity can be improved with an increase in the addition amount of the water-soluble fluorescent coloring material A. In addition, the water-soluble fluorescent coloring material A is a direct dye having a sulfone group and having poor water solubility (the solubility is less than 2% by mass with respect to 98% by mass of purified water), while showing good solubility in an organic solvent. As shown in FIG. 3, the fluorescent emission of the water-soluble fluorescent coloring material A with a standard excitation wavelength of 254 nm has a wide fluorescent emission region ranging from 425 nm to about 650 nm with a peak wavelength of 510 nm. Therefore, the more the addition amount of the water-soluble fluorescent coloring material A, the higher the fluorescent emission intensity is, resulting in an increase in excitation energy applied to the first fluorescent coloring material. Furthermore, as shown in the lower graph in FIG. 5, the absorption of visible light in the water-soluble fluorescent coloring material A is in the range of 380 nm (peak value) or more and 440 nm or less and also includes UV absorption. Therefore, even though the addition amount of the water-soluble fluorescent coloring material A increases considerably, the fluorescent emission characteristics of the compound itself, the intensity in the excitation wavelength region applied to the first fluorescent coloring material, and the fluorescent emission characteristics of the first fluorescent coloring material itself are not lowered.

Furthermore, the solvents to be used in the ink may be preferably purified water into which the first fluorescent coloring material can be dissolved in a large amount and an organic solvent into which the second fluorescent coloring material can be dissolved in a large amount. More preferably, a surfactant is included as a liquid solvent. The relationship between the solvents sufficiently exerts the characteristic of widely forming a fixed image in a state in which the first coloring material is provided as a monomolecular form and the characteristic of uniformizing the disperse-fixed state of the second fluorescent coloring material and the first fluorescent coloring material. The level of the fluorescent emission characteristics of ink on a recorded image (see the graph in FIG. 8) can be raised more than that of the fluorescent emission characteristics of the ink with an excitation wavelength of 254 nm in the evaporated state of ink (see the graph in FIG. 7). Thus, the water-soluble fluorescent coloring material A is a preferable specific example having the constitution and the characteristic which attain many of the objects of the multiple fluorescent coloring materials of the present invention.

Hereinafter, the combination of C.I. Acid Red 52 as a first fluorescent coloring material and the water-soluble fluorescent coloring material A as a second fluorescent coloring material will be described using the standard emission wavelength (here, 600 nm) of the first fluorescent coloring material (AR52) obtained at a standard excitation wavelength (254 nm) as a standard of measurement, while including the constitution of each embodiment of the multiple fluorescent coloring materials of the present invention.

Embodiment 1

Figure 6:
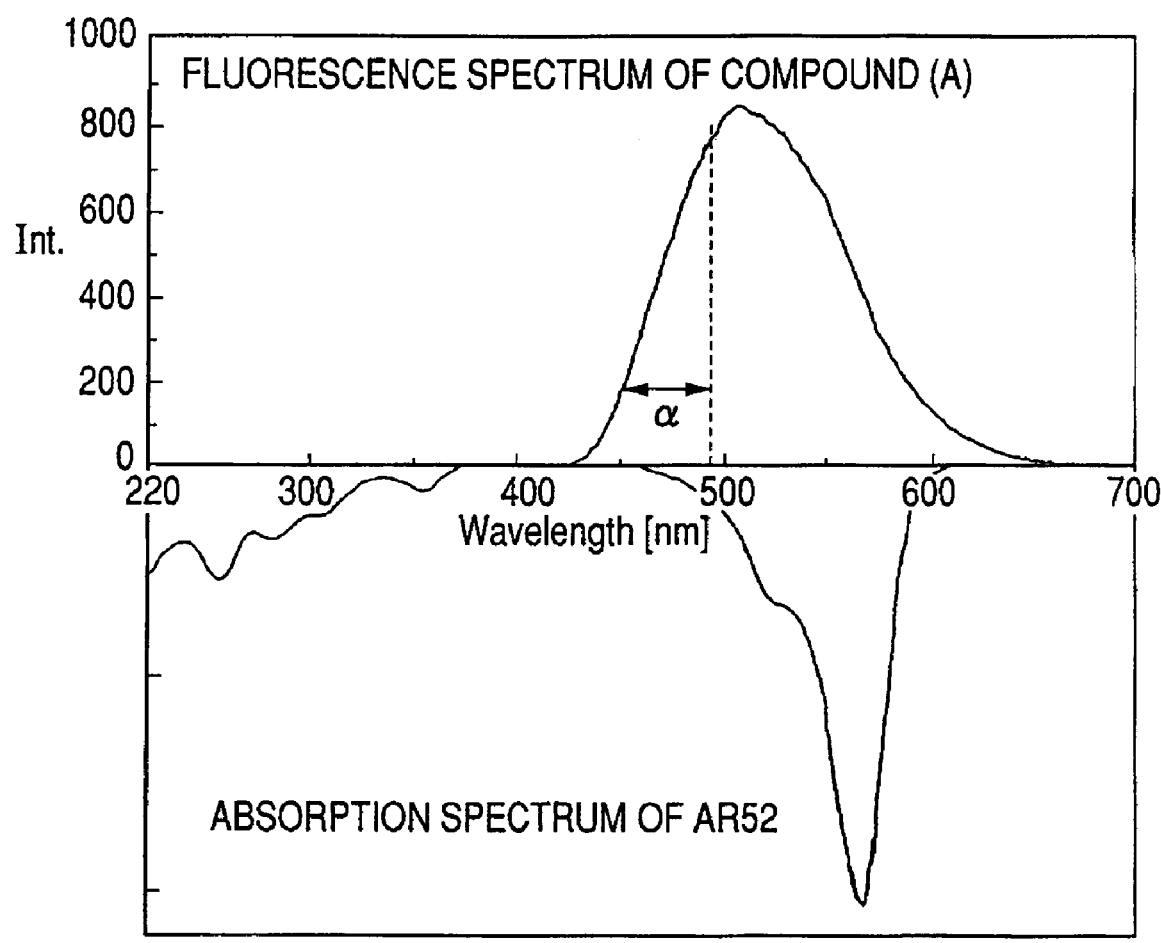
FIG. 6 is a diagram showing a comparison between the fluorescence spectrum of the compound (A) at 254 nm and the absorption spectrum of C.I. Acid Red 52.

A feature of Embodiment 1 is characterized in that the fluorescent emission wavelength region of the second fluorescent coloring material includes at least the peak wavelength region having the excitation wavelength characteristics for obtaining a standard emission wavelength of the first fluorescent coloring material (600 nm) (see FIG. 2) and/or the absorption spectrum of the first fluorescent coloring material at wavelengths of visible light (see the lower side of FIG. 6). According to Embodiment 1, the relationship between a fluorescent emission wavelength region, an excitation wavelength region, and an absorption wavelength region attains the effects of complementing energy loss and improving efficiency. As a result, excellent fluorescence intensity can be obtained.

At first, a predetermined amount (in this case, 0.3% by mass with respect to the solution) of C.I. Acid Red 52 (AR52) as the first fluorescent coloring material was dissolved into an aqueous solution (an organic solvent such as glycerin and purified water), followed by heating at 60° C. to completely vaporize water content, resulting in ink (hereinafter, referred to as evaporated ink). When the evaporated ink was subjected to excitation with 254 nm using a measuring device (FP 750, manufactured by JASCO Corporation), the fluorescent emission was brought about as shown in FIG. 1, and the excitation wavelength for obtaining a standard emission wavelength of 600 nm was expressed as an absorption spectrum in FIG. 2.

Figure 2:
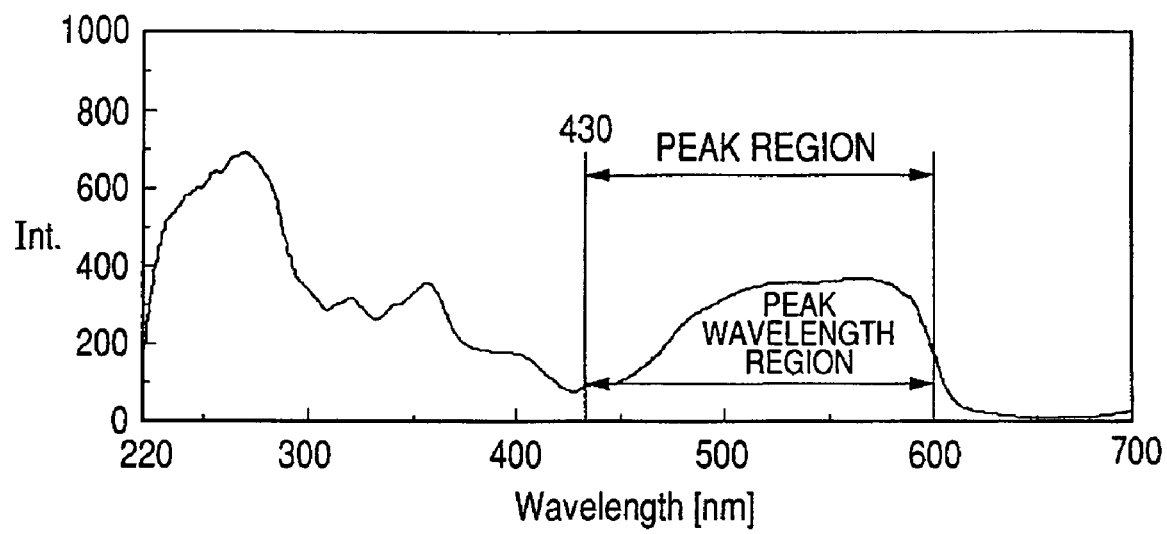
FIG. 2 is a diagram showing the excitation spectrum of C.I. Acid Red 52 at a fluorescent emission wavelength of 600 nm.
Figure 2:
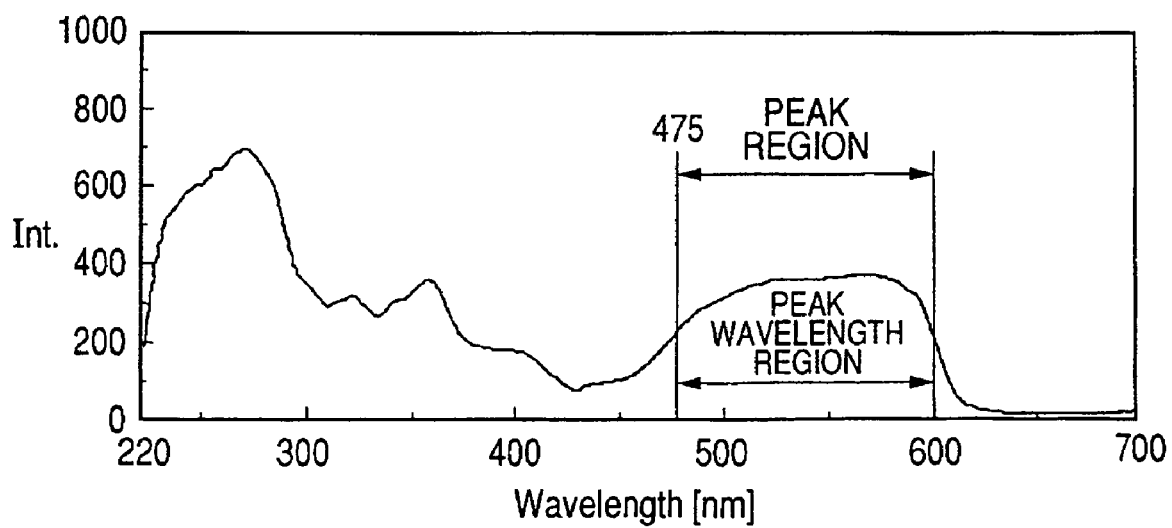

FIG. 2 shows a wavelength region of 380 nm or less of the UV region including a peak region having a peak at a wavelength near 265 nm and a peak region having a peak at a wavelength near 360 nm, and also one peak region in the visible light region.

Generally, a wavelength of UV excitation to be used for determination is 254 nm or 365 nm, and the following has been found by making studies on the energy conversion efficiency. That is, at an excitation intensity of 100, which is plotted as the ordinate in FIG. 2, a reliable effect can be observed. Thus, it was confirmed that the intensity appropriate to the determination can be effectively indicated. Therefore, "the peak wavelength region corresponding to the peak region adjacent to the standard fluorescence wavelength" of the fluorescent emission of the first fluorescent coloring material in the multiple fluorescent coloring materials of the present invention has a practical meaning in consideration of the above energy conversion efficiency. In other words, in "the spectrum (FIG. 2) of the excitation wavelength for obtaining the standard fluorescence wavelength" of the first fluorescent coloring material, a region with the above intensity of 100 or more in the spectrum with a peak adjacent to the standard fluorescence wavelength is defined as a peak region. A wavelength that provides this region is a peak wavelength region.

Therefore, in FIG. 2, when the standard fluorescence wavelength of AR52 is 600 nm (the standard excitation wavelength: 254 nm), the peak wavelength region thereof is in the range of 430 nm or more and 600 nm or less, preferably 475 nm or more and 600 nm or less. In contrast, as shown in FIG. 3, the water-soluble fluorescent coloring material A as a second fluorescent coloring material includes the wavelength region of 430 nm or more and 600 nm or less in the peak wavelength region when the excitation is carried out with the standard excitation wavelength, and has at least a main fluorescent emission region with a wide range of at least 450 nm to 600 nm. Of course, from each of the figures, when the above intensity is set to be 100, it can be also understood that the water-soluble fluorescent coloring material A performs fluorescent emission that satisfies such a range.

Figure 4:
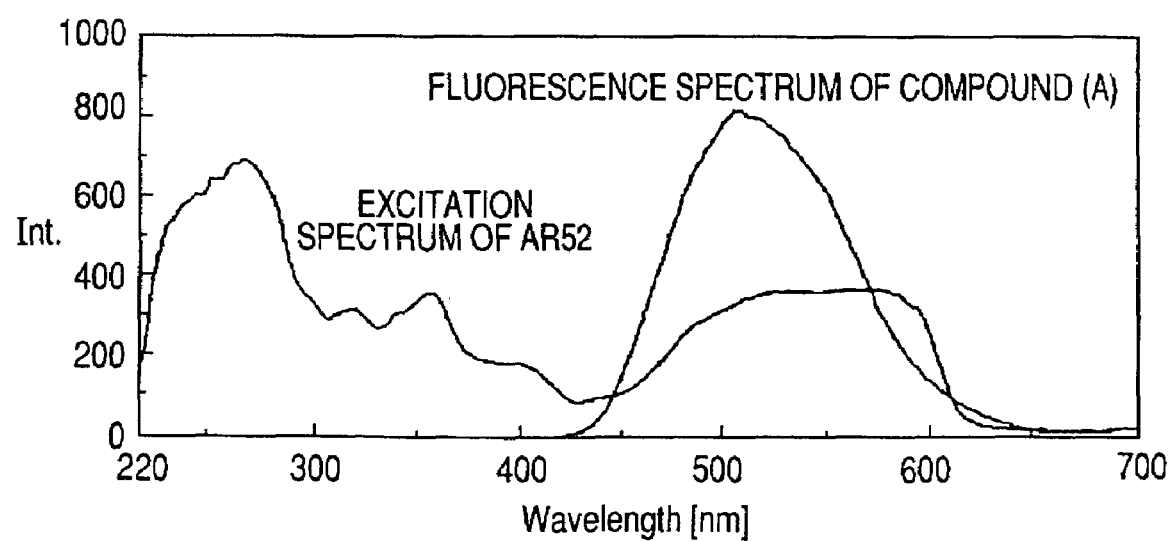
FIG. 4 is a diagram showing a comparison between the excitation spectrum of C.I. Acid Red 52 at a fluorescent emission wavelength of 600 nm and the fluorescent emission spectrum of the compound (A) at an excitation wavelength of 254 nm.

FIG. 4 is a graph showing the relationship between fluorescent emission wavelength characteristics of the water-soluble fluorescent coloring material A and an excitation wavelength for obtaining the emission of AR52 at 600 nm, where the excitation wavelength spectrum (FIG. 2) of the first fluorescent coloring material and the wavelength spectrum (FIG. 3) of the fluorescent emission of the second fluorescent coloring material are overlapped. As can be understood from FIG. 4, the wavelength (510 nm) at which the maximum emission intensity of the water-soluble fluorescent coloring material A appears shows an emission intensity of 800 or more, hence it is sufficiently superior to the wavelength (600 nm) at which the maximum emission intensity of AR52 shown in FIG. 1 appears. Therefore, the emission region of the second fluorescent coloring material includes the peak wavelength region of the first fluorescent coloring material, and the energy conversion can be efficiently performed, thus the fluorescence intensity of the standard fluorescence wavelength can be improved synergistically only by applying the standard excitation wavelength.

Figure 5:
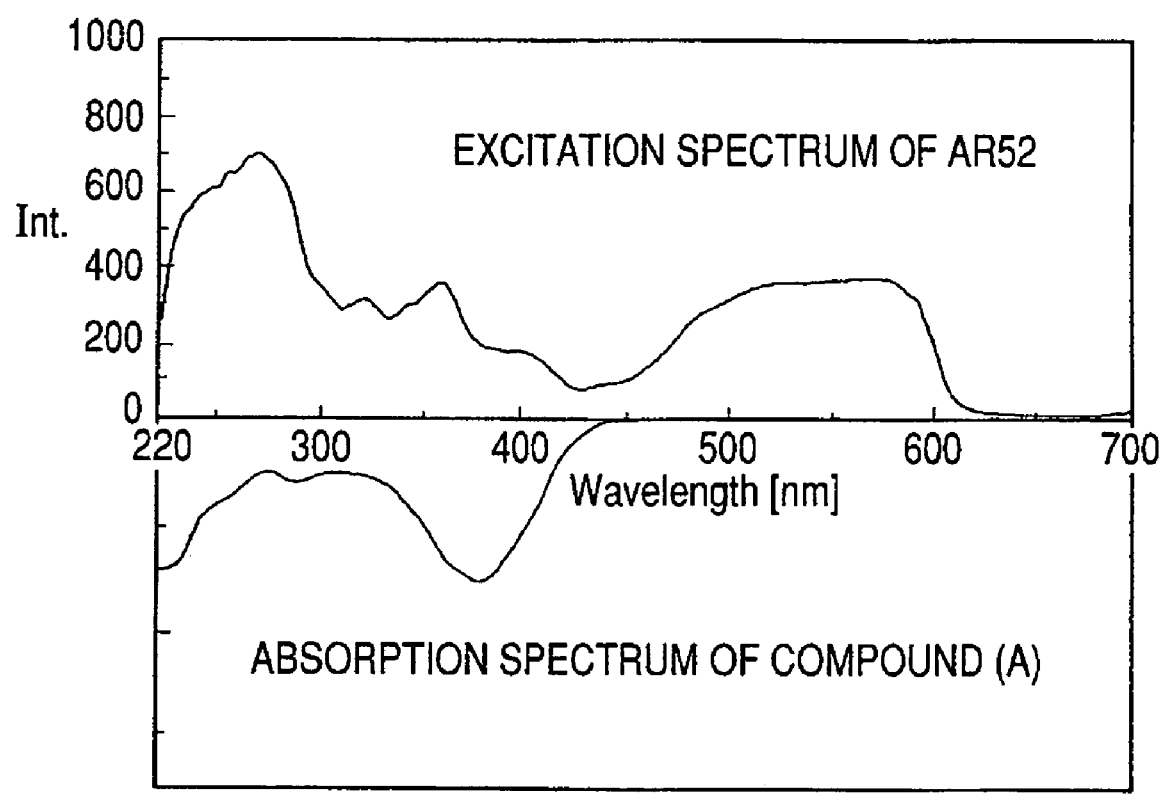
FIG. 5 is a diagram showing a comparison between the excitation spectrum of C.I. Acid Red 52 at a fluorescent emission wavelength of 600 nm and the absorption spectrum of the compound (A).

Next, the item which should be taken into consideration as a loss side is the absorption spectrum of a coloring material to be used. FIG. 5 is a diagram showing the excitation spectrum of AR52 for obtaining the fluorescent emission at 600 nm (the upper graph) and the light absorption spectrum of the water-soluble fluorescent coloring material A (the lower graph), where the upper and lower graphs are contrasted with each other at the same wavelengths. Here, the absorption and the excitation cannot be numerically contrasted with each other, but the relative relation therebetween can be found. Generally, the absorption spectrum is partially common to a part of the emission wavelength region, but shifts to shorter wavelengths than the emission wavelength. The light absorption spectrum of the water-soluble fluorescent coloring material A is also common to a part of the fluorescent emission wavelength region shown in FIG. 3, and has an absorption spectrum at a wavelength of 440 nm or less. The absorption spectrum exerts practical effects at wavelengths near the peak. Therefore, it is preferable that no region proximate to the maximum absorption wavelength (380 nm) of the water-soluble fluorescent coloring material A is present in the main excitation wavelength region (in the range of 425 nm or more and 600 nm or less) of AR52 having a fluorescence intensity of 100 or more. Furthermore, it is preferable that no wavelength region (425 nm or less) of the main absorption spectrum is present. In any event, the absorption spectrum has no range overlapped on the peak wavelength region, so that the absorption spectrum is not directly affect the above energy conversion.

If the percentage at which the emission of the second fluorescent coloring material corresponding to the excitation wavelength region of the first fluorescent coloring material is absorbed by the absorption spectrum is large, it can be judged that an improvement in fluorescence intensity has loss.

The wavelength region of the fluorescent emission of the water-soluble fluorescent coloring material A is in an effective excitation wavelength region for obtaining a standard emission wavelength of AR52. The emission from the water-soluble fluorescent coloring material A is further utilized in the excitation of AR52. In addition, the absorption spectrum of the water-soluble fluorescent coloring material A does not lower the efficiency of the energy conversion. Therefore, the fluorescent emission from the second fluorescent coloring material comes to be additional excitation energy of the first fluorescent coloring material, and it becomes possible to improve fluorescence properties.

As is evident from a comparison between FIG. 1 and FIG. 3, the wavelength region of the fluorescent emission of AR52 and the wavelength region of the fluorescent emission of the water-soluble fluorescent coloring material A are overlapped at least in the range of 580 nm or more and 620 nm or less. The overlap provides an additionally effective relationship for the determination with the standard emission wavelength.

Next, the characteristics of the multiple fluorescent coloring materials of the present invention with respect to the absorption spectrum of the first fluorescent coloring material will be described. FIG. 6 is a graph in which the absorption spectrum inherent in AR52 (the lower graph) and the spectrum of the fluorescent emission of the water-soluble fluorescent coloring material A (the upper graph) are combined at the same wavelengths. It is preferable to consider the absorption spectrum of AR52 as loss energy with respect to the wavelength region of the fluorescent emission of the above water-soluble fluorescent coloring material A. The absorption spectrum of AR52 shifts to 600 nm or less with a peak near 560 nm and has the main absorption in the visible light region up to 460 nm. The effective range of the absorption spectrum of AR52 is smaller than the above and thus ranges from 500 nm or more to 590 nm or less.

Considering the range (550 nm or more) of the fluorescent emission of AR52 shown in FIG. 1 and the intensity thereof, the absorption spectrum is judged to exert the absorption effect in the range of 500 nm or more and 560 nm or less. Because the absorption spectrum is in the visible light region, conventionally, the absorption spectrum has been eliminated from technical discussion on the fluorescent emission of AR52. However, in the multiple fluorescent coloring materials of the present invention, multiple different fluorescent coloring materials are used, and the absorption spectrum has come to be a point to be considered for the two-stage excitation energy conversion. That is, when the absorption spectrum is recognized as a problem to be solved, it is cited as one measure for solving the problem that the fluorescent emission of the second fluorescent coloring material occurs in a wavelength region which is out of the range of the absorption spectrum and includes an excitation wavelength for obtaining the standard fluorescence wavelength.

FIG. 6 shows this relationship. As can be seen from the upper and lower graphs in the figure, the fluorescent emission can be obtained more in the range of 430 nm or more and 515 nm or less which is nearly unaffected by the absorption spectrum. The wavelength region of the fluorescent emission of the water-soluble fluorescent coloring material A provided as a second fluorescent coloring material includes the fluorescent emission region of the second fluorescent coloring material (in FIG. 6, the region denoted by α: 430 nm≦α≦500 nm) at wavelengths shorter than the peak (560 nm) of the absorption spectrum of AR52 and the substantial absorption region (500 nm or more and 590 nm or less). The light in this region is used as the excitation energy of the first fluorescent coloring material. Therefore, the entire fluorescence intensity of the standard emission wavelength can be enhanced. In other words, the reason for this enhancement is as follows. At least the region α is overlapped with the second excitation wavelength region of AR52 provided as the first fluorescent coloring material, and thus the region α contributes to an improvement in the fluorescence intensity of AR52 provided as the first fluorescent coloring material.

Figure 10:
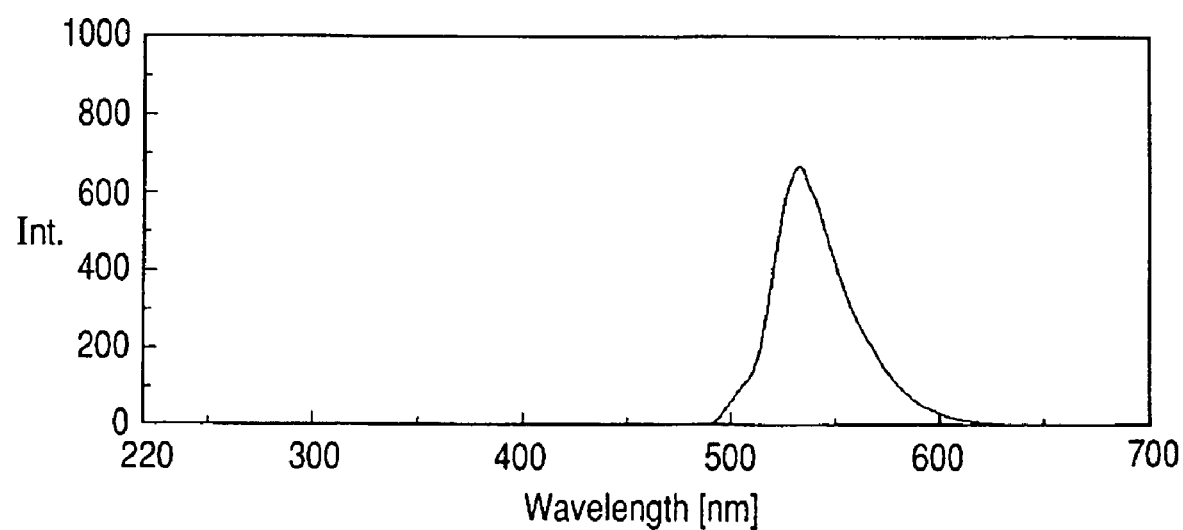
FIG. 10 is a diagram showing the fluorescent emission spectrum of C.I. Acid Yellow 73 at an excitation wavelength of 254 nm.

Next, as a comparative example, a combination of C.I. Acid Yellow 73 (AY73) with AR52 will be explained with reference to FIGS. 10 to 13 as described in Patent Document 2. In each figure, the evaporated ink was used when UV light was applied, while the absorption was measured with the normal ink. As shown in FIG. 10, AY73 generates the fluorescent emission in a wavelength region of about 500 to 600 nm (peak: 530 nm) when the excitation is performed with a standard excitation wavelength of 254 nm.

Figure 11:
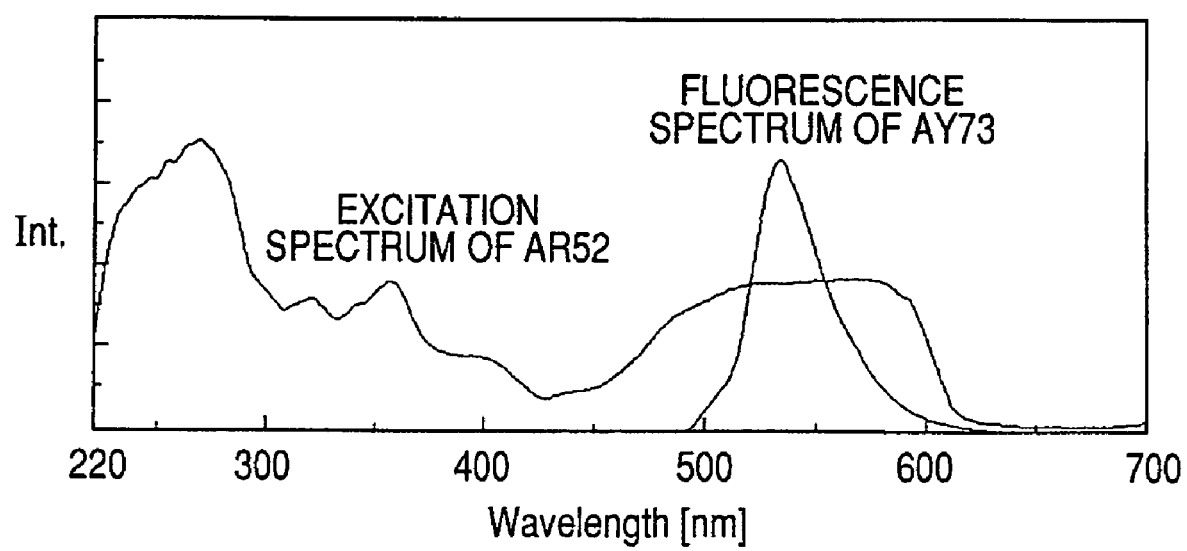
FIG. 11 is a diagram showing a comparison between the excitation spectrum of C.I. Acid Red 52 at a fluorescent emission wavelength of 600 nm and the fluorescent emission spectrum of C.I. Acid Yellow 73 at an excitation wavelength of 254 nm.

In FIG. 11, the fluorescent emission graph of AY73 of FIG. 10 is superimposed on the excitation wavelength spectrum of AR52 shown in FIG. 2. As is evident from this figure, the fluorescent emission of AY73 is generated in a wavelength region of about 500 to 600 nm (peak: 530 nm), but the wavelength region of the effective emission intensity (of 100 or more) is increasingly narrowed into the range of 505 nm to 590 nm and further into the range of 510 nm to 575 nm. Compared with the wavelength range of 475 nm or more and 600 nm or less of the peak wavelength region described above, the fluorescent emission of AY73 is included in the range of the peak wavelength region. Therefore, AY73 does not generate fluorescence emission enough for AR52 to cause emission.

Figure 12:
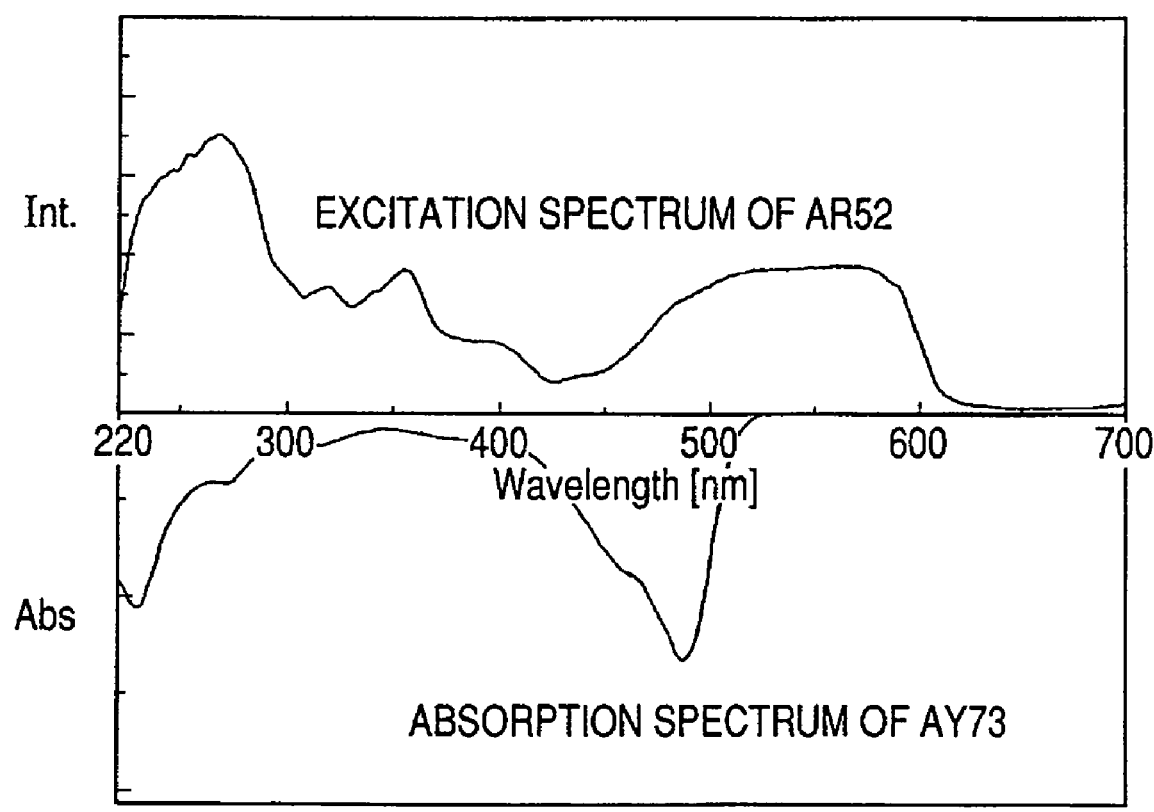
FIG. 12 is a diagram showing a comparison between the excitation spectrum of C.I. Acid Red 52 at a fluorescent emission wavelength of 600 nm and the absorption spectrum of C.I. Acid Yellow 73.

FIG. 12 shows a comparison between the excitation spectrum of AR52 for obtaining the fluorescent emission at 600 nm and the light absorption spectrum of AY73. The light absorption spectrum of AY73 is in the whole visible light region of 525 nm or less and has a peak at 490 nm. As a multiple-fluorescence example of the multiple fluorescent coloring materials, assuming that ink contains the water-soluble fluorescent coloring material A including AR52 and AY73, the light absorption spectrum of AY73 acts in the direction in which the effects of the water-soluble fluorescent coloring material A are reduced. Therefore, as for a multiple-fluorescence example of the multiple fluorescent coloring materials, it is necessary to increase the addition amount of the water-soluble fluorescent coloring material A as much as desired (see (Embodiment 2) described below) and to compensate for loss due to the light absorption spectrum of AY73. Furthermore, as shown in FIG. 12, the maximum absorption wavelength (490 nm) of AY73 is present in the excitation wavelength region (450 nm or more and 600 nm or less) of AR52.

Figure 13:
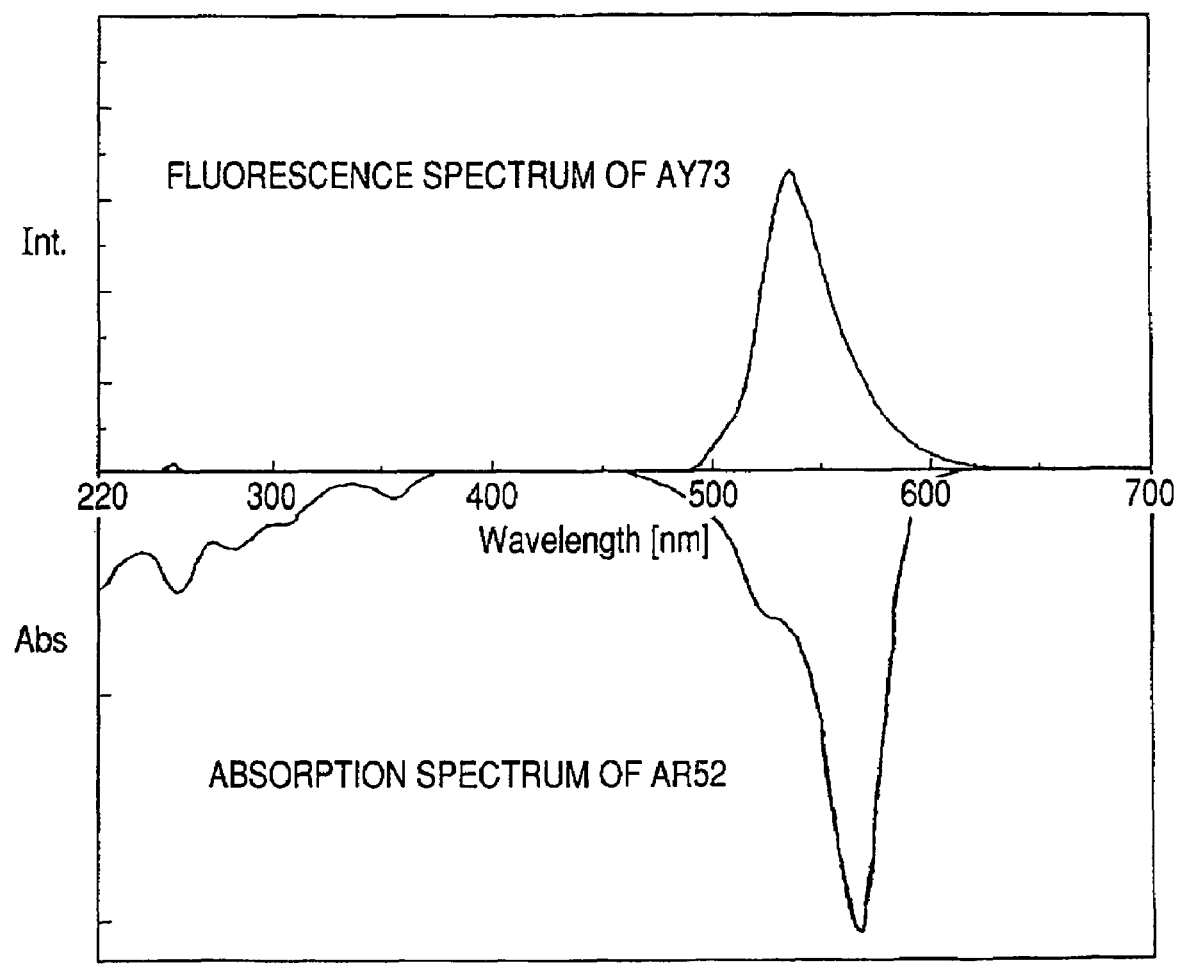
FIG. 13 is a diagram showing a comparison between the fluorescence spectrum of C.I. Acid Yellow 73 at 254 nm and the absorption spectrum of C.I. Acid Red 52.

In addition, FIG. 13 shows a combination of the absorption spectrum of AR52 shown in the lower graph of FIG. 6 and the fluorescence spectrum of AY73. As can be seen from FIG. 13, the fluorescence spectrum of AY73 is included in a substantial absorption region (500 nm or more and 590 nm or less) of the absorption spectrum of AR52, and no emission wavelength is observed at shorter wavelengths than the above absorption region. Therefore, when only AR52 and AY73 are combined, it does not correspond to any of the constitutions of the multiple fluorescent coloring materials described above and does not exhibit the effects of the multiple fluorescent coloring materials.

Figure 7:
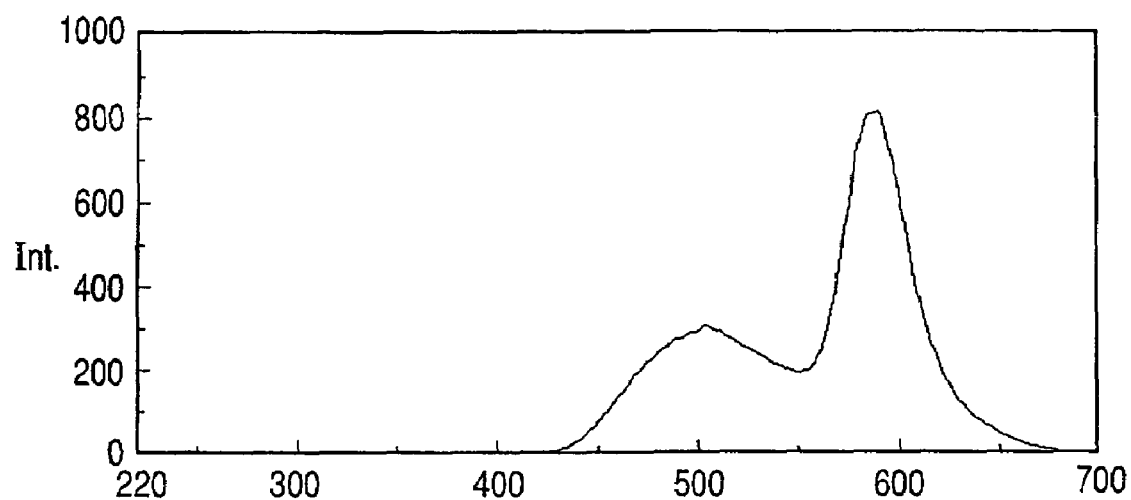
FIG. 7 is a diagram showing the fluorescence spectrum of ink provided as a mixture of C.I. Acid Red 52 and the compound (A).
Figure 8:
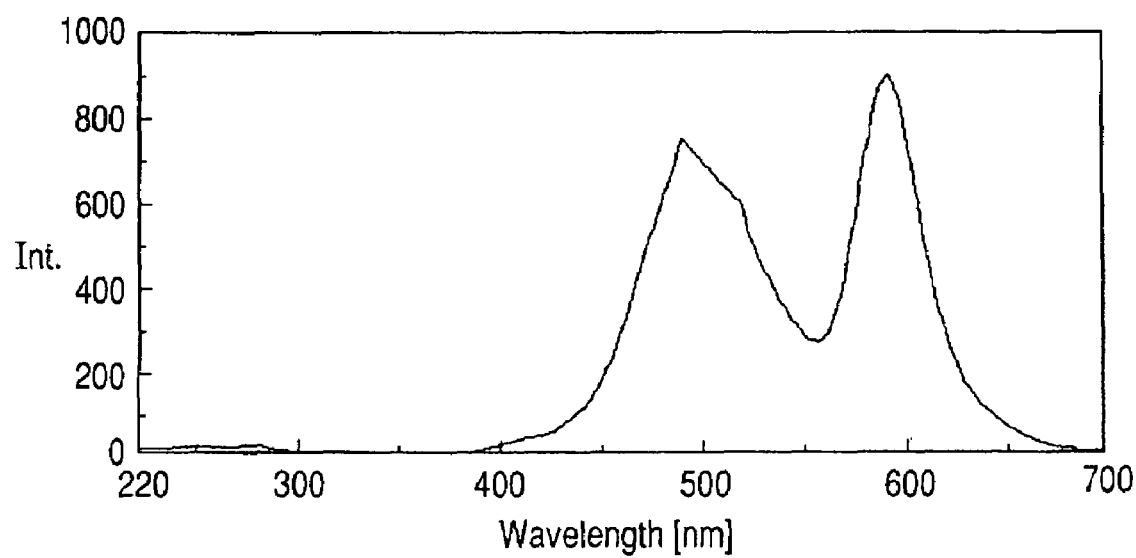
FIG. 8 is a diagram showing the fluorescence spectrum of a printed image with the ink provided as a mixture of C.I. Acid Red 52 and the compound (A).

Referring back to FIGS. 7 to 9, the multiple fluorescent coloring materials will be further described in view of ink and a recorded image. FIG. 7 represents the measurements obtained by preparing recording ink that contains both AR52 and the water-soluble fluorescent coloring material A, purified water, and an organic solvent, followed by exciting the recording ink as the evaporated ink at a standard excitation wavelength of 254 nm by means of the FP-750. FIG. 8 represents the measurements obtained by exciting an image recorded on a recording medium using the recording ink at a standard excitation wavelength of 254 nm by means of the FP-750. In other words, FIG. 7 shows the results of studying the characteristics of the recording ink of the multiple fluorescent coloring materials with evaporated ink, and FIG. 8 shows the characteristics of a recorded image with the recording ink of the multiple fluorescent coloring materials, and the use of the recording ink of the multiple fluorescent coloring materials can be figured out in terms of the recorded image.

The effects of the multiple fluorescent coloring materials will be confirmed by comparing FIG. 7 and FIG. 8. This is because the same ink is used in those figures, which is effective in a relative comparison. In each of FIG. 7 and FIG. 8, the graph has two peaks in the vicinity of 500 nm and at 590 nm, respectively. As is evident from each of FIG. 1 and FIG. 3 described above, the water-soluble fluorescent coloring material A presents a peak at approximately 500 nm, and AR52 presents a peak at 590 nm. As can be seen from the comparison between FIG. 7 and FIG. 8, with respect to FIG. 7 showing AR52 and the water-soluble fluorescent coloring material A which are in an ideal dissolved state, a recorded image receives a further increase in fluorescence intensity, particularly an increase in fluorescence intensity of the standard emission wavelength (600 nm, or the whole range of 580 nm to 620 nm).

From the above, it is proved that in the recorded image, each of the coloring materials effectively utilizes the standard excitation wavelength, and it is possible to obtain the emission from the water-soluble fluorescent coloring material A as a second fluorescent coloring material and the emission from the first fluorescent coloring material using the emission from the water-soluble fluorescent coloring material A. Generally, when the fluorescent coloring materials are associated with each other, a peak wavelength is shifted toward longer wavelengths. However, in the comparison between FIG. 7 and FIG. 8, there is no such shift. Thus, the absence of the shift means that the association-preventing action of the multiple fluorescent coloring materials and other technological contents were revealed as a result. FIG. 7 shows a result obtained by investigating the characteristics of the recording ink of the multiple fluorescent coloring materials with the evaporated ink. FIG. 8 shows the characteristics of the recorded image with the recording ink of the multiple fluorescent coloring materials, representing the use of the recording ink of the multiple fluorescent coloring materials in terms of the recorded image.

Furthermore, the evaporated ink that contains both of AR52 and the water-soluble fluorescent coloring material A has two peaks as shown in FIG. 7. Therefore, it is evident that the water-soluble fluorescent coloring material A compensates for all characteristics of AR52 even in the case of using recording ink, and the fluorescent emission of the water-soluble fluorescent coloring material A exerts its characteristics enough to enhance the standard emission wavelength. In addition, as shown in FIG. 8, since the recorded image has two peaks, it is shown that the fluorescent ink in which the concentration quenching hardly occurs is completed and durability that continues to enhance the fluorescence intensity in the long term is provided.

Figure 9:
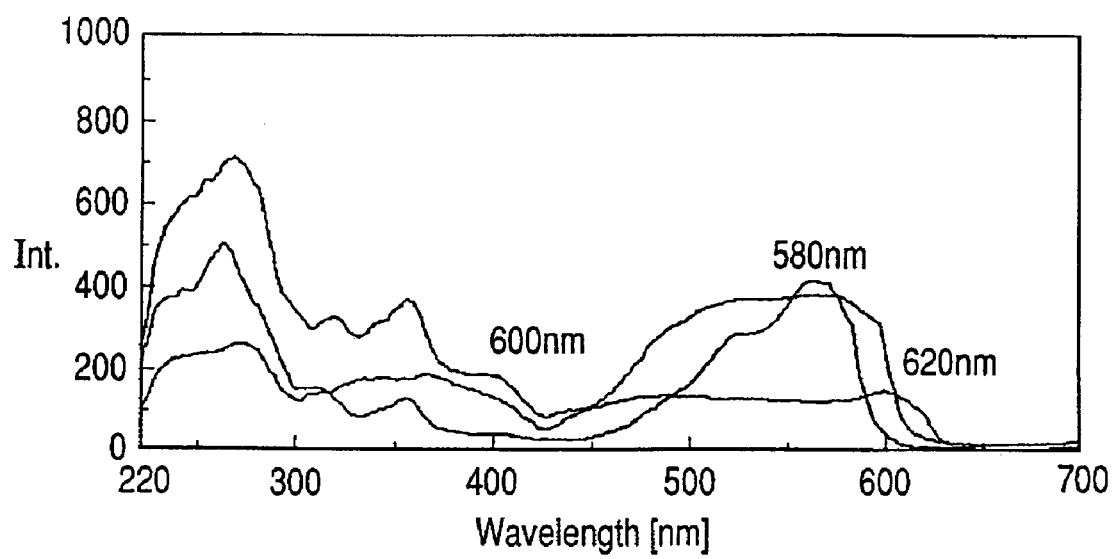
FIG. 9 is a diagram showing the excitation spectra of C.I. Acid Red 52 at 580, 600, and 620 nm, respectively.

It should be noted that the standard fluorescence wavelength of the fluorescent emission of the multiple fluorescent coloring materials can be selected depending on the application of ink and an image formed by the ink. For example, FIG. 9 shows the excitation spectrum of AR52 obtained by changing the fluorescent emission wavelength (standard fluorescence wavelength) to each of 580, 600, and 620. Thus, the peak wavelength region, which is a peak region adjacent to each standard fluorescence wavelength, can be defined according to the multiple fluorescent coloring materials.

As described above, in the case where the standard emission wavelength is defined as wavelengths in the whole range of 580 nm or more and 620 nm or less, it is preferable that the fluorescent emission wavelength depending on the standard excitation wavelength of the second fluorescent coloring material satisfy almost all the peak wavelength region of the excitation spectrum. In this case, however, considering the effect level for exerting more effects than the conventional one, the fluorescent emission wavelength may be a highly effective single wavelength, preferably a wavelength in a wider region (for example, where a center wavelength is 600 nm, 600 nm±5 nm or ±10 nm). That is, the fluorescent emission wavelength is a wavelength at which standard fluorescent emission is obtained with ease among the excitation spectrum. For instance, in the case of AR52, as shown in FIG. 9, it is more efficient to satisfy the peak wavelength region of only the above excitation spectrum of 600 nm than the excitation spectra of 580 nm and 620 nm. The effects of Embodiment 1 above can be naturally enhanced as long as the addition amount of the second fluorescent coloring material can be increased.

Embodiment 2

Embodiment 2 relates to an ink in which the addition amount of the second fluorescent coloring material can be increased by the characteristic requirement in the structure of the second fluorescent coloring material which has not been identified in the past. That is, the conditions for wavelengths described in Embodiment 1 are eased (at least a part of wavelengths has a wavelength region common to an excitation spectrum). The relationship between the energy at the excitation wavelength and the energy at the emission wavelength can be improved by the addition amount of the second fluorescent coloring material. More specifically, the association of the first coloring material can be prevented with the basic structure of the coloring material having an association-preventing function, while the addition amount of the second fluorescent coloring material can be increased. As a result, the intensity at the standard emission wavelength can be enhanced. The intensity of the fluorescent emission at the first excitation wavelength of the first fluorescent coloring material can be improved by using a combination of the first and second fluorescent coloring materials at least one of which, preferably the second fluorescent coloring material, has the basic structure of the following atoms or atomic groups, or of the following fluorescence emission group.

In particular, the structure of a coloring material preferably has the multiple fluorescence emission groups. That is, a coloring material having multiple fluorescence emission groups in the same molecular structure is structurally large, and shows enhanced three-dimensional properties, as compared with the conventional fluorescent coloring material. Thus, it becomes difficult to regularly aggregate or associate the coloring material as compared to the conventional fluorescent coloring material. Therefore, even if the content of the fluorescent coloring material in the ink is increased as compared with that of the conventional coloring material, it is difficult to decrease the fluorescence intensity. Furthermore, a coloring material having multiple fluorescence emission groups in the same molecular structure contains multiple fluorescence emission groups in the single molecule of the coloring material. Thus, the fluorescent emission per molecule becomes strong, and the fluorescent emission intensity can be enhanced. In addition, as described above, compared with the conventional fluorescent coloring material, the fluorescent coloring material is structurally large, and shows enhanced three-dimensional properties, so that the coloring materials can be easily adsorbed on the components of the recording material, resulting in good water resistance. Furthermore, when the fluorescent coloring material has substantivity, its water resistance can be improved and also the substantivity can contribute to the durability of fluorescent emission. Furthermore, the coloring material having multiple fluorescence emission groups in the same molecular structure is difficult to regularly aggregate or associate, compared with the conventional coloring material. Therefore, for example, even if the water content in the ink is evaporated, the aggregation of the coloring material hardly has regularity. Accordingly, a strong aggregated state is hardly caused, so that excellent sticking resistance can be obtained. This mechanism allows the ink of the multiple fluorescent coloring materials to have good fluorescence intensity and water resistance. In addition, the coloring material having multiple fluorescence emission groups in the same molecular structure further improves the effects of the multiple fluorescent coloring materials using a sulfonic acid with a strong affinity with water as a hydrophilic group.

As a preferable fluorescence emission group that satisfies the above requirements and is functionally effective, an aminostilbene disulfonic acid derivative may be cited. The structure of the water-soluble fluorescent coloring material A described above also contains this derivative.

In the case of a fluorescent coloring material such as the conventional coloring material, even if the concentration of the coloring material is increased in ink, the fluorescence intensity of the coloring material may not be increased, but the fluorescence intensity may be decreased. In the case of using such a fluorescent coloring material, the applicable concentration range (content in the ink) is narrowed, and there is a limit of raising fluorescence intensity. On the other hand, in a combination of the first and second fluorescent coloring materials according to the multiple fluorescent coloring materials which bring color emission into visible light, the fluorescence intensity can be further increased when the content of the fluorescent coloring material is increased depending on an increment of the content.

Examples of fluorescence emission groups applicable to the multiple fluorescent coloring materials and having atomic groups and groups capable of exerting the fluorescence brightness functions may include those described above. Here, the fluorescent coloring material of the multiple fluorescent coloring materials may have a light absorption wavelength region in the visible light region or in a region except the visible light region. Then, the fluorescent coloring material performs fluorescent emission to provide the excitation wavelength region described above. Therefore, it is important that the coloring material is one that performs fluorescent emission in the visible light region. As represented by the structural formulae, the water-soluble fluorescent coloring material A has a dimeric structure including multiple fluorescence emission groups and multiple sulfone groups.

Thus, when the fluorescent coloring material contains the fluorescence emission groups, the fluorescence intensity obtained by excitation at the standard excitation wavelength of the first fluorescent coloring material can be increased. This is because the fluorescent emission in the standard excitation wavelength region of the first fluorescent coloring material is improved. In particular, the aminostilbene disulfonic acid derivative is preferable because it has a wide fluorescent emission region.

Embodiment 3

Embodiment 3 is used effectively alone or in combination with each of Embodiments 1 and 2. Embodiment 3 is a technology for improving fluorescence intensity by appropriately arranging the fluorescent coloring material at the time of recording with a solvent such as a mixed solvent of a first solvent having high solubility of a first coloring material and low solubility of a second coloring material and a second solvent having high solubility of the second coloring material. Some dyes cause a chemical phenomenon known as association to keep a dye molecule stable in energy. In this phenomenon of association, with a dye molecule having an nearly flat structure having two or less circular skeletons, two molecules face each other. In addition, the supplement and loss of energy are performed only between the two molecules.

Therefore, for a fluorescent dye, the phenomenon may be a factor of inhibiting the fluorescence property of the dye. This state is kept not only in the ink but also in a printed article on a sheet of paper, and hence, a measure for preventing the dye from associating is required. Generally, it has been known to add urea, naphthalene sulfonic acid, or the like as an association-preventing agent for preventing the association. However, if an association-preventing agent itself has florescence properties to enhance the fluorescence intensity of the first fluorescent coloring material, and has an association-preventing function, it is possible to attain both effects of enhancing the fluorescence intensity and of efficiently generating fluorescence by virtue of prevention of association.

Then, at the time of combining a second fluorescent coloring material capable of enhancing the fluorescence intensity of a first fluorescent coloring material when the excitation light is applied with the same excitation wavelength, a mixed solvent is used containing a first solvent having high solubility for the first coloring material and low solubility for the second coloring material and a second solvent having high solubility for the second coloring material.

Here, the term "high solubility" means that the coloring material can be dissolved at a concentration of roughly 3% by mass or more, and the term "low solubility" means that the coloring material can be dissolved at a concentration of less than roughly 3% by mass.

For instance, when water is selected as a first solvent and glycerin is selected as a second solvent, water has high solubility for AR52 and low solubility for the water-soluble fluorescent coloring material A. In addition, glycerin has high solubility for the water-soluble fluorescent coloring material A. Then, ink is prepared by adding AR52 and the water-soluble fluorescent coloring material A to a solvent containing water and glycerin. In the ink, the water-soluble fluorescent coloring material A' is under an environment of an excess amount of a poor solvent, hence the water-soluble fluorescent coloring material A can be dissolved in a weak associated state, thereby forming a stable system together with AR52. However, when the ink is applied to a recording medium, water, which is a poor solvent, quickly permeates and diffuses. On the other hand, glycerin slowly permeates and diffuses into a recording medium, which is also ascribable to its high viscosity. At this time, the water-soluble fluorescent coloring material A is dissolved not into water, a poor solvent, but into glycerin, a good solvent. Thus, the water-soluble fluorescent coloring material A slowly diffuses and permeates into the recording medium together with glycerin. Furthermore, because glycerin is a good solvent, the water-soluble fluorescent coloring material A is adsorbed in the form of a monomolecule on the recording medium. Therefore, good fluorescent emission can be caused. Furthermore, the water-soluble fluorescent coloring material A is dissolved in the form of a monomolecule, so the water-soluble fluorescent coloring material A can also prevent the association of AR52. In other words, the molecules of the water-soluble fluorescent coloring material A and AR52 are fixed on the recording medium in a state that they are mixed and dispersed together to an appropriate degree. Thus, the enhanced effect on the fluorescence intensity of AR52 by means of the water-soluble fluorescent coloring material A may be significantly exhibited. In this case, the first fluorescent coloring material and the second fluorescent coloring material each preferably have multiple sulfone groups.

Furthermore, in order to desirably express the above phenomenon, the content of the fluorescent coloring material to be used is preferably equal to or less than the content of the fluorescent coloring material to be dissolved into a poor solvent to be used.

On the other hand, when a state in which the association hardly occurs is observed in terms of the molecular structure of the fluorescent coloring material, if at least one of the first and second coloring materials has a structure containing three or more circular skeletons, the molecules of the first and second coloring materials do not overlap but become adjacent to each other. As a result, the molecules can easily give and receive the energy mentioned above. Furthermore, the fluorescence property can be increased.

Thus, the second fluorescent coloring material to be used in the multiple fluorescent coloring materials preferably has multiple fluorescence emission groups. More preferably, the second fluorescent coloring material further has a basic structure for fluorescence brightening. Furthermore, the multiple fluorescence emission groups included in the second fluorescent coloring material are preferably dimers.

As described above, an example of a circular skeleton of a second fluorescent dyestuff includes a circular skeleton with a circular structure including a double bond or a conjugated double bond, with an aromatic ring structure, with a cyclo ring structure, or with a heterocyclic structure.

When the first fluorescent coloring material and the second fluorescent coloring material are water-soluble coloring materials, these two fluorescent coloring materials have preferably the same water-soluble groups for preventing the association with improved ease. More preferably, the water-soluble groups are sulfone groups which are unaffected by the pH-dependent solubility of ink. In the multiple fluorescent coloring materials, for color matching or the like, in addition to the above two fluorescent coloring materials, additional fluorescent coloring materials or coloring materials without fluorescence may be added as the third coloring materials.

Next, an aqueous liquid medium that constitutes a fluorescent ink of the multiple fluorescent coloring materials together with the dye described above is described. The aqueous liquid medium to be used in the multiple fluorescent coloring materials is preferably mainly composed of water. The water content in the ink is desirably in the range of 10 to 95% by mass, preferably 25 to 93% by mass, or more preferably 40 to 90% by mass with respect to the total mass of the ink. Water to be used in the multiple fluorescent coloring materials is preferably ion-exchange water. Furthermore, for the ink of the multiple fluorescent coloring materials, water may be solely used as an aqueous liquid medium or may be used in combination with a water-soluble organic solvent to further increase the effects of the multiple fluorescent coloring materials.

Since any one of the above-described water-soluble organic solvents can be used as a water-soluble organic solvent that can be used in the multiple fluorescent coloring materials, the description thereof is omitted here. The content of the water-soluble organic solution in ink is desirably equal to or less than 50% by mass, preferably, 5 to 40% by mass, or more preferably 10 to 30% by mass with respect to the total mass of the ink. Of those solvents, ethylene glycol, diethylene glycol, triethylene glycol, 2-pyrrolidone, glycerin, and 1,2,6-hexanetriol are preferably used. Further, the ink of the multiple fluorescent coloring materials preferably contains urea, ethylene urea, or trimethylolpropane as a humectant similar to a solvent. Of those, ethylene urea and trimethylolpropane are particularly suitable to the multiple fluorescent coloring materials. The content of those is preferably 1% by mass or more and 20% by mass or less with respect to the total mass of the ink.

The fluorescent ink of the multiple fluorescent coloring materials made up as described above is particularly effective when used in ink-jet recording. As an inkjet recording method, there are a recording method in which mechanical energy is allowed to act on ink to eject liquid droplets and an ink-jet recording method in which thermal energy is supplied to ink to form bubbles and eject liquid droplets. The fluorescent ink of the multiple fluorescent coloring materials is particularly suitable to those ink-jet recording methods.

Next, the multiple fluorescent coloring materials will be described more specifically with reference to multiple fluorescence examples and reference examples. Here, measurement values obtained with purified water diluted solutions of coloring materials were used for an absorption wavelength region, a maximum absorption wavelength region, and a fluorescence wavelength region. Using an absorption spectrometer, absorption wavelengths were measured. A diluted solution was prepared in such a manner that the absorbance thereof was in the range of 0.5 to 0.7. A higher region from a base line as the absorption peak of the coloring material was defined as an absorption wavelength region, and the peak value was defined as a maximum absorption wavelength. In addition, for fluorescence wavelengths, the measurement conditions were set so that the fluorescence intensities were not beyond the measurement threshold value. Then, fluorescence wavelengths were measured by using the diluted solution used in the measurement of absorbance and by fixing the excitation wavelengths of the first and second coloring materials at predetermined wavelengths. A region higher than the base line was defined as a fluorescent emission wavelength region.

Inks in the following multiple fluorescence examples satisfy the constitution of one of print inks according to the first to sixth aspects described above.

MULTIPLE FLUORESCENCE EXAMPLE 1

The following components were added to be adjusted to predetermined concentrations, and then the components were mixed and agitated sufficiently, followed by filtration through a micro-filter (manufactured by Fuji Photo Film Co., Ltd.) with a pore size of 0.2 μm under pressure to prepare an ink.

| | |
|---|---|
| C.I. Acid Red 52 (first fluorescent coloring material): | 0.25 part by mass |
| Water-soluble fluorescent coloring material A (second fluorescent coloring material): | 1 part by mass |
| Glycerin: | 7.5 parts by mass |
| Diethylene glycol: | 5 parts by mass |
| Urea: | 5 parts by mass |
| Acetylenol E100 (Acetylene glycol EO adduct, manufactured by Kawaken Fine Chemicals Co., Ltd.): | 1 part by mass |
| Water: | 80.25 parts by mass |

The fluorescent emission spectra and excitation spectra of the first and second fluorescent coloring materials were measured using a fluorometer FP-750 (trade name; manufactured by JASCO Corporation). Each measurement sample was an ink from which water content was evaporated to remove the influence of water on the measurement.

The absorption wavelength regions of the first and second coloring materials were measured using a spectrophotometer U-3200 (trade name; manufactured by Hitachi Ltd.) after the dye had been diluted 100,000-fold with purified water. The absorption wavelength region of the first coloring material ranged from 450 to 620 nm, and the maximum absorption wavelength thereof was 565 nm. In addition, the absorption wavelength region of the second coloring material ranged from 300 to 450 nm, and the maximum absorption wavelength thereof was 372 nm.

REFERENCE EXAMPLE 1

The following components were added to be adjusted to predetermined concentrations, and then the components were mixed and agitated sufficiently, followed by filtration through a micro-filter (manufactured by Fuji Photo Film Co., Ltd.) with a pore size of 0.2 μm under pressure to prepare an ink.

| | |
|---|---|
| C.I. Acid Red 52 (first fluorescent coloring material): | 0.25 part by mass |
| Glycerin: | 7.5 parts by mass |
| Diethylene glycol: | 5 parts by mass |
| Urea: | 5 parts by mass |
| Acetylenol E100 (Acetylene glycol EO adduct, manufactured by Kawaken Fine Chemicals Co., Ltd.): | 1 part by mass |
| Water: | 81.25 parts by mass |

<Evaluation>

(1) Fluorescence Intensity

Using an ink-jet recording apparatus BJS600 (manufactured by Canon Inc.) having an on-demand type multi-recording head from which ink is ejected by applying thermal energy depending on a recording signal to the ink, a solid pattern of 50% duty was printed on ink-jet plain paper SW-101 manufactured by Canon Inc. Subsequently, under the following conditions, the fluorescence intensity was measured using a fluorometer (FP-750) manufactured by JASCO Corporation. The results were evaluated on the basis of the criteria described below and were listed in Table 1. The conditions at the measurement were as follows: the excitation wavelength was set to be 254 nm; the fluorescence intensity at the maximum fluorescence wavelength was measured; and the measured fluorescence intensity was normalized by defining the fluorescence intensity of the ink of Reference Example 1 as 100, and evaluation was made according to the following criteria:

A: The measured fluorescence intensity was 150 or more;

B: The measured fluorescence intensity was 110 or more and less than 150; and

C: The measured fluorescence intensity was less than 110.

(2) Color Developability

Using an ink-jet recording apparatus BJS600 (manufactured by Canon Inc.) having an on-demand type multi-recording head from which ink is ejected by applying thermal energy depending on a recording signal to the ink, a solid pattern of 50% duty was printed on ink-jet plain paper SW-101 manufactured by Canon Inc. Subsequently, the density of a printed recorded matter was measured using a Macbeth RD-918.

A: 0.7 or more, at which a printed matter is visually legible at once;

B: 0.5 or more and less than 0.7, at which a printed image is visually legible;

C, 0.3 or more and less than 0.5, at which a printed matter is visually legible with difficulty; and D: less than 0.3, at which a printed matter is not visually legible.

(3) Fastness Property

Using an ink-jet recording apparatus BJS600 (manufactured by Canon Inc.) having an on-demand type multi-recording head from which ink is ejected by applying thermal energy depending on a recording signal to the ink, a solid pattern of 50% duty was printed on ink-jet plain paper SW-101 manufactured by Canon Inc. Subsequently, the paper was allowed to stand for 24 hours, and was immersed in tap water for 5 minutes. Then, the change of printing density was evaluated using a Macbeth RD 918 on the basis of the following criteria:

A: density change of less than 50%, at which a printed matter is visually legible at once;

B: 50% or more and less than 70%, at which a printed matters is visually legible; and C: 70% or more, at which a printed matter is not visually legible.

TABLE 1

|  | (1) Fluorescence intensity | (2) Color developability | (3) Fastness property |
|---|---|---|---|
| Multiple Fluorescence Example 1 | A | B | B |
| Reference Example 1 | C | B | C |

MULTIPLE FLUORESCENCE EXAMPLES 2 TO 6 AND REFERENCE EXAMPLES 2 AND 3

Each ink was prepared according the composition shown in Table 2 in each of Multiple Fluorescence Examples 2 to 6 and Reference Examples 2 and 3. In addition, the relationships of fluorescence, excitation and absorption by the combination of the first and second coloring materials of Multiple Fluorescence Example 4, the relationships of fluorescence, excitation and absorption by the combination of the first and second coloring materials of Multiple Fluorescence Example 5, and the relationships of fluorescence, excitation and absorption by the combination of the first and second coloring materials of Reference Example 3 are not described, but should be understood from the technical description of the multiple fluorescent coloring materials and the description of the reference examples described above in FIGS. 1 to 13. In addition, each of the above reference examples uses the combination of the conventional coloring materials while using the same solvent conditions as those of the multiple fluorescent coloring materials. Thus, each of the above reference examples is provided for reference.

TABLE 2

|  | Multiple fluorescent agents |  |  |  |  | Reference Example |  |
|---|---|---|---|---|---|---|---|
|  | 2 | 3 | 4 | 5 | 6 | 2 | 3 |
| First coloring material | AR52 0.25% by mass | AR52 0.25% by mass | BV10 0.25% by mass | AR52 0.25% by mass | AR52 0.25% by mass | AR52 0.5% by mass | AR52 0.25% by mass |
| Second coloring material | Fluorescent coloring material A 1% by mass | Fluorescent coloring material A 2% by mass | Fluorescent coloring material A 1% by mass | SG7 0.3% by mass | Fluorescent coloring material A 1% by mass | AY73 0.5% by mass | AY184 1% by mass |
| Third coloring material | AR92 0.6% by mass | AR92 0.6% by mass | — | — | — | — | — |
| First solvent | Glycerin 7.5% by mass | Glycerin 7.5% by mass | Triethylene glycol 7.5% by mass | Xylitol 7.5% by mass | — | Glycerin 7.5% by mass | Glycerin 7.5% by mass |
| Diethylene glycol | 5% by mass | 5% by mass | 5% by mass | 5% by mass | 5% by mass | 5% by mass | 5% by mass |
| Urea | 5% by mass | 5% by mass | 5% by mass | 5% by mass | 5% by mass | 5% by mass | 5% by mass |
| Acetylenol E100 | 1% by mass | 1% by mass | 1% by mass | 1% by mass | 1% by mass | 1% by mass | 1% by mass |
| Second solvent (water) | 79.65% by mass | 78.65% by mass | 80.25% by mass | 80.95% by mass | 87.75% by mass | 80.5% by mass | 80.25% by mass |

Each of the inks prepared as above was irradiated with light at an excitation wavelength of 254 nm. Then, the spectrum of the resulting fluorescent emission was obtained. For the inks of Multiple Fluorescence Examples 2 to 4, as described in FIGS. 7 and 8 in detail, effects such as two strong peaks in fluorescence intensities were identified by referring to FIGS. 7 and 8 and by making a comparison between FIGS. 7 and 8. On the other hand, such a relationship as found in FIGS. 7 and 8 was not seen in the inks of Reference Examples 1 to 3.

Furthermore, the fluorescence intensities and so on were evaluated just as in the case of each of Multiple Fluorescence Example 1 and Reference Example 1. As shown in Table 3, substantial differences were not seen.

In addition, each of the inks of Multiple Fluorescence Examples 1 to 6 and Reference Examples 1 to 3 was printed on commercially available woodfree paper by means of a commercially available ink-jet recording apparatus BJS600 (trade name: manufactured by Canon Inc.) with the number of passes increased in such a manner that a dot would be substantially superimposed on another dot. As a result, it was confirmed that an increase in fluorescence intensity and printing density were attained by increasing the number of passes.

Furthermore, an ink of Multiple Fluorescence Example 6-1 having the same solvent composition as the ink of Multiple Fluorescence Example 6 and using 0.25% by weight of AR52 as a fluorescent coloring material and an ink of Multiple Fluorescence Example 6-2 having the same solvent composition as the ink of Multiple Fluorescence Example 6 and using 1.0% by weight of the fluorescent coloring material A as a fluorescent coloring material were prepared. In addition, each of the resultant inks of Multiple Fluorescence Examples 6-1 and 6-2 was printed on commercially available woodfree paper by means of a commercially available ink-jet recording apparatus BJS600 (trade name: manufactured by Canon Inc.) with the number of passes increased in such a manner that 50% or more of a dot would be substantially superimposed on another dot. As a result, it was confirmed that increases in fluorescence intensity and a printing density were attained by increasing the number of passes.

The reason for this is probably as follows. When ink forms a laminar shape on a recording material, in the relationship between a second coloring material that emits excitation light for causing a first coloring material to emit light and the first coloring material that receives the emission from the second coloring material as excitation light, the first coloring material can efficiently receive the emission from the second coloring material that emits light over a wide range on the recording material in a scattered manner, whereby the efficiency of the transfer and reception of light energy between the second coloring material and the first coloring material can be increased.

TABLE 3

|  |  | (1) Fluorescence intensity | (2) Color developability | (3) Fastness property |
|---|---|---|---|---|
| Multiple Fluorescence Example | 2 | A | A | A |
|  | 3 | A | A | A |
|  | 4 | A | B | B |
|  | 5 | A | B | B |
|  | 6 | B | B | B |
| Reference Example | 2 | C | A | C |
|  | 3 | C | C | C |

As described above, according to the multiple fluorescent coloring materials, it is possible to provide: a fluorescent ink having high fluorescence intensity, high color developability, and high fastness property, which cannot be attained in prior art; and an ink-jet recording method using such a fluorescent ink.

In the recording method according to the present invention, ink composed of such constituent components as described above is stored in an ink storing member formed of a compound selected from the group consisting of polyacetate and polyolefin, or an ink storing member having an ink holding member constituted of a compound selected from the group consisting of polyacetate and polyolefin, and the ink stored in the ink storing member is supplied via a gap to a recording material. In particular, an ink holding member formed of polypropylene out of polyolefin or an ink holding member constituted of a condensation compound is preferably used. Furthermore, the ink holding member composed of such material is preferably porous, preferably has a multilayer structure, or is preferably composed of a fiber aggregate. That is, a compound selected from the group consisting of polyacetate and polyolefin is stable against an influence by pH, water, an organic solvent, and the like. According to the investigation made by the inventors of the present invention, the excellent properties of the ink to be used in the present invention are not impaired even when the ink is stored in an ink holding member and/or an ink storing member composed of such material, and hence, by using them in combination, high reliability can be stably maintained in image formation.

As described above, the ink to be used in the present invention can be used as ink for an ordinary stationery. However, an excellent effect can be obtained when the ink is applied to a recording method in which the ink is supplied via a gap to a recording material. Furthermore, a particularly excellent effect is exerted when the ink is used for an ink-jet recording method in which ink droplets are ejected through orifices in accordance with a recording signal to perform recording on a recording material, thereby obtaining a recorded matter. That is, unlike a system in which a stationery such as a ball-point pen is brought into contact with a recording material to perform recording on the recording material by virtue of tool force, ink-jet recording involves: causing an ink droplet that has been allowed to fly to impact the surface of a recording material; and performing recording by virtue of the permeation and spreading of the ink droplet itself. Therefore, the interfacial state of the ink droplet has a large influence on the expression of good recording including the fluorescence intensity of a coloring material with the aid of the above-described mechanism. As a result, a recorded matter having high image quality can be obtained.

Examples of an ink-jet recording system applicable to the present invention include a recording method in which mechanical energy is allowed to act on ink to eject liquid droplets and an ink-jet recording method in which thermal energy is supplied to the ink to form bubbles to eject liquid droplets. In the present invention, an ink-jet recording system of a type in which ink is ejected by the bubbling phenomenon of the ink due to thermal energy is particularly desirably applied because of its characteristics including extremely stable ejection and the prevention of, for example, the occurrence of a satellite dot. In this case, however, thermal property values (such as specific heat, thermal expansion coefficient, and thermal conductivity) may be adjusted.

Furthermore, the physical properties of the ink itself to be used in the present invention are desirably adjusted for improving matching with an ink-jet head. In particular, the surface tension and viscosity of the ink at 25° C. are desirably adjusted to 30 to 40 dyne/cm and 15 cP or less (preferably 10 cP or less, or more preferably 5 cP or less), respectively. Therefore, in order to adjust the ink to have the above physical properties to solve problems in plain paper, the water content in the ink to be used in the present invention is suitably 50% by mass or more and 98% by mass or less, or preferably 60% by mass or more and 95% by mass or less.

An example of an ink-jet recording apparatus suitable for performing recording by means of the ink to be used in the present invention includes an apparatus that applies thermal energy corresponding to a recording signal to ink in a chamber of a recording head to generate liquid droplets by means of the thermal energy.

As another embodiment of a recording head of an ejection system suitably adopted for the present invention in which a bubble is allowed to be in communication with the atmosphere at the time of such ejection as described above, the so-called edge shooter type as described in, for example, JP 2783647 B may be cited. The present invention particularly provides an excellent effect in a recording head or recording apparatus of an ink-jet system in which thermal energy is used to form flying liquid droplets, thereby performing recording, out of the ink-jet recording systems. As for the typical structure and principle of the system, it is preferable to use such basic principles as disclosed in, for example, the specifications of U.S. Pat. Nos. 4,723,129 and 4,740,796. The system is applicable to any one of what are called an on-demand type and a continuous type. In particular, the system is effective in the on-demand type because of the following reason. At least one driving signal which corresponds to recording information and causes an abrupt temperature rise exceeding film boiling is applied to an electrothermal transducer arranged corresponding to a sheet or liquid flow path holding a liquid (ink), thereby causing the electrothermal transducer to generate thermal energy. Then, a thermal action surface of a recording head is caused to generate film boiling. As a result, a bubble in the liquid (ink) can be formed so as to be in one-to-one correspondence with the driving signal. The growth and contraction of the bubble cause the liquid (ink) to be ejected through an opening for ejection, thereby forming at least one droplet. The driving signal is more preferably in the shape of a pulse because the growth and contraction of a bubble can be performed immediately and appropriately, and hence the liquid (ink) can be ejected with excellent responsiveness. U.S. Pat. Nos. 4,463,359 and 4,345,262 disclose suitable driving signals of the pulse shape. It should be noted that additionally excellent recording may be performed by adopting the conditions described in U.S. Pat. No. 4,313,124 disclosing an invention relating to a rate of temperature rise of the thermal action surface.

The constitution of a recording head constituting the ink-jet recording apparatus to be used in the present invention is preferably one disclosed in each of the specifications of U.S. Pat. Nos. 4,558,333 and 4,459,600 in which a thermal action portion is arranged in a bending region, in addition to a constitution (a linear liquid flow path or a right-angle liquid flow path) obtained by combining an ejection orifice, a liquid path, and an electrothermal transducer as disclosed in the above. In addition, the present invention is effective for a constitution based on: Japanese Patent Application Laid-Open No. S59-12367 disclosing a constitution in which a slit common to multiple electrothermal transducers serves as an ejection portion of the electrothermal transducers; or Japanese Patent Application No. S59-138461 disclosing a constitution in which an aperture for absorbing the pressure wave of thermal energy is allowed to correspond to an ejection portion.

Furthermore, a recording head of a full-line type having a length corresponding to the width of a recording material with the maximum range in which a recording apparatus can perform recording may employ any one of a constitution in which multiple recording heads are combined to satisfy the length and a constitution in which the multiple recording heads are integrally formed to serve as a single recording head disclosed in the above-described specifications. The present invention can exert the above-described effect with improved effectiveness. In addition, the present invention is effective also in the case where a recording head of an exchangeable chip type that is mounted on an apparatus main body to be electrically connected with the apparatus main body and to receive the supply of ink from the apparatus main body, or a recording head of a cartridge type which itself is integrally provided with an ink tank is used.

The addition of recovery means, preliminary auxiliary means, or the like to a recording head arranged in the constitution of the ink-jet recording apparatus to be used in the present invention is preferable because the effect of the present invention can be additionally stabilized. Specifically, capping means, cleaning means, pressurizing or absorbing means, or preliminary heating means such as an electrothermal transducer, a heating element separate from the electrothermal transducer, or a combination of them for a recording head, or the performance of a preliminary ejection mode for performing ejection separate from recording is also effective for stable recording.

Furthermore, the recording mode of a recording apparatus is not limited to a recording mode for a main color such as black, and may be a recording mode for multiple different colors or for a full color due to color mixing as a result of the integral constitution of multiple recording heads or combination thereof. The present invention is extremely effective for an apparatus including at least one of the recording mode for multiple different colors and the recording mode for a full color due to color mixing.

In the foregoing description, ink is treated as a liquid. In general, however, ink which solidifies at room temperature or lower, and which softens or becomes liquid at room temperature is used, or, in the above ink-jet system, ink itself is subjected to temperature adjustment in the range of 30° C. to 70° C. so that the viscosity of the ink falls within a stable ejection range. Therefore, any ink can be used as long as it is liquid at the time of applying a recording signal to be used.

In addition, ink which is prevented from solidifying by actively using a temperature rise due to thermal energy as the energy for the transition of the ink from a solid state to a liquid state or ink which solidifies when left for the purpose of preventing evaporation may be used. In any case, the use of ink that liquefies with the aid of thermal energy such as ink which liquefies to be ejected as liquid ink when supplied with thermal energy in accordance with a recording signal or ink that starts to solidify when reaching a recording medium is also applicable to the present invention. In such a case, ink may be opposed to an electrothermal transducer while being held as a liquid or solid in a recess or through-hole of a porous sheet as described in Japanese Patent Application Laid-Open No. S54-56847 or Japanese Patent Application Laid-Open No. S60-71260. In the present invention, it is most effective to perform the above film boiling system on each of the above inks.

Furthermore, the ink-jet recording apparatus to be used in the present invention may be provided as an image output terminal of an information processing instrument such as a word processor or a computer, the terminal being held together with or separate from the instrument. In addition, the ink-jet recording apparatus may be combined with a reader to serve as a copying device, or may be in the form of a facsimile device having transportation and reception functions.

EXAMPLES

Next, the present invention will be described more specifically. The terms "part" and "%" in the following description are "part by mass" and "% by mass" unless otherwise specified.

The following respective components as ink composition to be used were mixed and sufficiently stirred, and the resultant was dissolved and/or dispersed. After that, the resultant was filtered through a Phloropore filter (trade name; manufactured by Sumitomo Electric Industries, Ltd.) having a pore size of 0.1 µm under pressure to prepare each ink. An ink 1, an ink 2, an ink 3, and an ink 5 were defined as inks of Examples and an ink 4 was defined as Reference Example. The content of each fluorescent coloring material in ink for causing the concentration quenching of a fluorescent image printed on a recording material is 0.3% by mass or more for C.I. Acid Red 52, 2.0% by mass or more for C.I. Acid Red 92, or more than 2.0% by mass for the compound (A).

<Ink 1>

| | |
|---|---|
| C.I. Acid Red 52 (fluorescent coloring material) | 0.05% |
| C.I. Acid Red 92 | 0.6% |
| Triethylene glycol | 7% |
| Urea | 7% |
| Surfynol 465 (trade name; manufactured by Air Products) | 1% |
| Purified water | 83.9% |

<Ink 2>

| | |
|---|---|
| C.I. Acid Red 52 (fluorescent coloring material) | 0.2% |
| Glycerin | 7% |
| Triethylene glycol | 8% |
| IPA | 4% |
| Purified water | 80.8% |

<Ink 3>

| | |
|---|---|
| C.I. Acid Red 52 | 0.1% |
| IJX 266 (9.8 wt % aqueous solution, non-fluorescent coloring material, trade name; manufactured by Cabot Corporation) | 10.2% |
| Triethylene glycol | 10% |
| Ethylene glycol | 10% |
| Purified water | 78.9% |

<Ink 4>

| | |
|---|---|
| C.I. Acid Red 52 (fluorescent coloring material) | 0.5% |
| C.I. Acid Red 92 (fluorescent coloring material) | 1.2% |
| Triethylene glycol | 7% |
| Urea | 7% |
| Surfynol 465 (trade name; manufactured by Air Products) | 1% |
| Purified water | 83.4% |

<Ink 5>

| | |
|---|---|
| C.I. Acid Red 52 (fluorescent coloring material) | 0.05% |
| C.I. Acid Red 92 (fluorescent coloring material) | 0.6% |
| Fluorescent coloring material represented by general formula (A) (fluorescent coloring material) | 2.0% |
| IJX 266 (9.8-wt % aqueous solution, non-fluorescent coloring material, trade name; manufactured by Cabot Corporation) | 10.2% |
| Glycerin | 7% |
| Triethylene glycol | 7% |
| Surfynol 465 (trade name; manufactured by Air Products) | 1% |
| Purified water | 72.15% |

In each of the above ink compositions, the fluorescence intensity of each of the inks 1 to 4 was measured by means of a commercially available fluorescence measuring device FR-750 (trade name; manufactured by JASCO Corporation). As a result, each of the inks 1 to 3 had a fluorescent coloring material content equal to or lower than the content at which concentration quenching was expressed, while the ink 4 had a fluorescent coloring material content higher than the content at which concentration quenching started to occur.

Solid images each having a duty of 50% were printed so as to be superimposed on each other by increasing the number of passess by the use of each of the above inks and an ink-jet recording apparatus BJS600 (trade name; manufactured by Canon Inc.) in such a manner that dots are superimposed at least partly on each other. Then, fluorescence intensity and printing density were measured. In this example, printing was performed in such a manner that the positions of dots are identical to each other. Therefore, even if a slight error occurs, the area of a part where any two dots are superimposed on each other accounts for 50 to 100% of the dots.

In addition, the measurement values of the fluorescence intensity and the printing density are represented as multiples of the values in the case where the number of passes is one. In addition, fluorescence intensity at an emission wavelength of 600 nm with an excitation wavelength of 254 nm was measured by means of a commercially available fluorescence measuring device FR-750 (trade name; manufactured by JASCO Corporation). In addition, the printing density was measured by means of a commercially available Macbeth RD 915 (trade name; manufactured by Gretag Macbeth).

TABLE 4

| | | 1 pass | 2 passes | 3 passes | 4 passes |
|---|---|---|---|---|---|
| Ink | 1 | Standard | 1.15 | 1.33 | 1.45 |
| | 2 | Standard | 1.3 | 1.45 | 1.6 |
| | 3 | Standard | 1.15 | 1.2 | 1.25 |
| | 4 | Standard | 1 | 1 | 1 |
| | 5 | Standard | 1.09 | 1.13 | 1.23 |

TABLE 5

| | | 1 pass | 2 passes | 3 passes | 4 passes |
|---|---|---|---|---|---|
| Ink | 1 | Standard | 1.23 | 1.3 | 1.32 |
| | 2 | Standard | 1.28 | 1.35 | 1.47 |
| | 3 | Standard | 1.28 | 1.45 | 1.47 |
| | 4 | Standard | 1.2 | 1.4 | 1.5 |
| | 5 | Standard | 1.21 | 1.26 | 1.3 |

As can be seen from the foregoing, according to the present invention, a printing density can be increased without lowering fluorescence characteristics. Furthermore, a fluorescent coloring material content in ink is so set as to be lower than the content at which concentration quenching is expressed, both fluorescence intensity and printing density can be increased. It should be noted that the effect of the present invention can be obtained even when the coloring material concentration of a mixed liquid of an ink having a coloring material concentration equal to or higher than the concentration at which concentration quenching starts to occur and an ink having a coloring material concentration for substantially lowering the coloring material concentration of the former ink is consequently lower than the concentration at which concentration quenching occurs.

Furthermore, it is apparent without any example that the effect of the present invention can be additionally improved by using inks using two different kinds of fluorescent coloring materials out of those listed above. Even in such a case, sufficient fluorescence intensity and sufficient image density can be secured by means of ink having a concentration in the range in which no concentration quenching occurs.

This application claims priority from Japanese Patent Application No. 2004-319314 filed Nov. 2, 2005 which is hereby incorporated by reference herein.

What is claimed is:

1. A method of forming a fluorescent image, comprising forming a fluorescent image by using a fluorescent ink which contains a fluorescent coloring material in a content at which concentration quenching does not occur, and superimposing the fluorescent ink on the fluorescent image by an ink-jet recording method, wherein:

in the image, an area in which dots of the image overlap accounts for 50% or more of the dots;

the fluorescent ink comprises print ink containing: a first fluorescent coloring material that generates emission at a standard fluorescence wavelength to be used for measurement or determination among wavelengths resulting from fluorescent emission due to application of a standard excitation wavelength; and a second fluorescent coloring material that emits fluorescence by the standard excitation wavelength; and an emission wavelength region of the second fluorescent coloring material includes at least a main absorption wavelength region in a light absorption spectrum of the first fluorescent coloring material in an excitation wavelength region for obtaining the emission at the standard fluorescence wavelength of the first fluorescent coloring material in the ink.

2. A method of forming a fluorescent image according to claim 1, wherein the fluorescent ink contains a surfactant.

3. A method of forming a fluorescent image according to claim 1, wherein:

the emission wavelength region of the second fluorescent coloring material substantially includes at least a peak wavelength region that corresponds to a peak region adjacent to the standard fluorescence wavelength in the excitation wavelength region for obtaining the emission at the standard fluorescence wavelength of the first fluorescent coloring material in the ink.

4. A method of forming a fluorescent image according to claim 3, wherein:

the standard excitation wavelength is 254 nm;

the peak wavelength region is in a range of 430 nm or more and 600 nm or less; and the emission wavelength region of the second fluorescent coloring material includes a wavelength of 600 nm as the standard fluorescence wavelength, and has an emission wavelength in a range of 425 nm or more and 600 nm or less.

5. A method of forming a fluorescent image according to claim 3, wherein the first fluorescent coloring material has a peak region of an absorption spectrum in a visible light region, and the wavelength region of the fluorescent emission of the second fluorescent coloring material includes a region of wavelengths shorter than the peak region of the absorption spectrum.

6. A method of forming a fluorescent image according to claim 1, wherein the main absorption wavelength region of the first fluorescent coloring material is in a range of 500 nm or more and 590 nm or less, and the main emission wavelength region of the second fluorescent coloring material is in a range of 450 nm or more and 600 nm or less.

7. A method of forming a fluorescent image according to claim 1, wherein the second fluorescent coloring material comprises a coloring material having a structure with multiple fluorescence emission groups.

8. A method of forming a fluorescent image according to claim 1, wherein:

the second fluorescent coloring material has a structure with multiple fluorescence emission groups; and the emission wavelength region of the second fluorescent coloring material has a wavelength region common to at least a part of the excitation wavelength region for obtaining the emission at the standard fluorescence wavelength of the first fluorescent coloring material in the ink.

9. A method of forming a fluorescent image according to claim 1, wherein the fluorescent ink comprises aqueous ink in which an emission spectrum of the ink, which emits fluorescence by the standard excitation wavelength when the aqueous print ink is in at least one of a water content evaporated ink state and a printed image state, exhibits a first peak including the emission at the standard fluorescence wavelength and a second peak in the excitation wavelength region for obtaining the emission at the standard fluorescence wavelength of the first fluorescent coloring material in the ink.

10. A method of forming a fluorescent image according to claim 1, wherein:

the emission wavelength region of the second fluorescent coloring material includes at least a peak wavelength region corresponding to a peak region adjacent to the standard fluorescence wavelength in the excitation wavelength region for obtaining the emission at the standard fluorescence wavelength of the first fluorescent coloring material in the ink; and a main absorption wavelength region in a light absorption spectrum of the second fluorescent coloring material is in a shorter wavelength region than the excitation wavelength region for obtaining the emission at the standard fluorescence wavelength of the first fluorescent coloring material.

11. A method of forming a fluorescent image according to claim 10, wherein the standard excitation wavelength is 254 nm, the peak wavelength region of the first fluorescent coloring material is in a range of 430 nm or more and 600 nm or less, and the absorption wavelength region of the second fluorescent coloring material is 440 nm or less.

12. An ink-jet recording method for performing the method of forming a fluorescent image according to claim 1, comprising:

ejecting ink through an ejection orifice; and applying the ink to a recording medium, thereby performing recording.

13. A recorded image formed by the method of forming a fluorescent image according to claim 1, the recorded image comprising multiple layers of the fluorescent ink.

14. A method of forming a fluorescent image comprising superimposing fluorescent ink to form a fluorescent image, wherein a content of a fluorescent component in the fluorescent ink is lower than a content at which a fluorescent printed image obtained by the method is subjected to concentration quenching, wherein:

in the image, an area in which dots of the image overlap accounts for 50% or more of the dots;

the fluorescent ink comprises print ink containing: a first fluorescent coloring material that generates emission at a standard fluorescence wavelength to be used for measurement or determination among wavelengths resulting from fluorescent emission due to application of a standard excitation wavelength; and a second fluorescent coloring material that emits fluorescence by the standard excitation wavelength;

an emission wavelength region of the second fluorescent coloring material includes at least a main absorption wavelength region in a light absorption spectrum of the first fluorescent coloring material in an excitation wavelength region for obtaining the emission at the standard fluorescence wavelength of the first fluorescent coloring material in the ink; and the fluorescent ink is applied by an ink-jet recording method.

* * * * *